United States Patent
Tsurutani

(10) Patent No.: US 8,982,349 B2
(45) Date of Patent: Mar. 17, 2015

(54) MEASURING OPTICAL SYSTEM, AND COLOR LUMINANCE METER AND COLORIMETER USING THE SAME

(75) Inventor: Katsutoshi Tsurutani, Osaka (JP)

(73) Assignee: Konica Minolta Optics, Inc., Osaka (JP)

( * ) Notice: Subject to any disclaimer, the term of this patent is extended or adjusted under 35 U.S.C. 154(b) by 75 days.

(21) Appl. No.: 13/638,723

(22) PCT Filed: Mar. 8, 2011

(86) PCT No.: PCT/JP2011/001346
§ 371 (c)(1), (2), (4) Date: Oct. 1, 2012

(87) PCT Pub. No.: WO2011/121896
PCT Pub. Date: Oct. 6, 2011

(65) Prior Publication Data
US 2013/0021611 A1    Jan. 24, 2013

(30) Foreign Application Priority Data

Mar. 31, 2010   (JP) .................................. 2010-083954

(51) Int. Cl.
*G01N 21/25* (2006.01)
*G01B 11/00* (2006.01)
(Continued)

(52) U.S. Cl.
CPC ................. *G01J 3/02* (2013.01); *G01J 3/0208* (2013.01); *G01J 3/0218* (2013.01); *G01J 3/024* (2013.01); *G01J 3/506* (2013.01); *G01J 3/51* (2013.01); *G01J 3/513* (2013.01); *G02B 27/10* (2013.01); *G02B 27/1006* (2013.01); *G02B 6/04* (2013.01); *G02B 6/2804* (2013.01);
(Continued)

(58) Field of Classification Search
USPC .................................................. 356/416, 419
See application file for complete search history.

(56) References Cited

U.S. PATENT DOCUMENTS 3,707,030 A * 12/1972 Hunter et al. ................ 29/419.1
3,709,612 A *  1/1973 Clemens ....................... 356/407
(Continued)

FOREIGN PATENT DOCUMENTS

| JP | 2002-345737 | 12/2002 |
| JP | 2003-084214 | 3/2003 |

(Continued)

*Primary Examiner* — Michael A Lyons
*Assistant Examiner* — Hina F Ayub
(74) *Attorney, Agent, or Firm* — Cozen O'Connor

(57) ABSTRACT

In a measuring probe (40) according to the present invention, measuring light is split into a two or more through a split optical system (12), and, when each split light is received by a light-receiving sensor (13B, 13B, 15B) through an interference filter (13A, 14A, 15A) serving as a color filter, the split light is introduced into the interference filter (13A, 14A, 15A) through a collecting lens group (123C, 14C, 15C) formed as a substantially bilateral telecentric system. The interference filter (13A, 14A, 15A) is formed to obtain a transmittance characteristic corresponding to a measurement parameter, depending on a condition of an intensity distribution with respect to incidents angles of light incident on the interference filter (13A, 14A, 15A). Thus, the measuring probe (40) according to the present invention can reduce an influence of a deviation in the transmittance characteristic due to incident angles, even using the interference filter (13A, 14A, 15A).

8 Claims, 24 Drawing Sheets

(51) Int. Cl.
  *G01J 3/46* (2006.01)
  *G01J 3/02* (2006.01)
  *G01J 3/50* (2006.01)
  *G01J 3/51* (2006.01)
  *G02B 27/10* (2006.01)
  *G02B 6/04* (2006.01)
  *G02B 6/28* (2006.01)
  *G02F 1/1362* (2006.01)
  *G02F 1/13* (2006.01)

(52) U.S. Cl.
  CPC ............ *G02F 2001/136254* (2013.01); *G02F 2203/69* (2013.01); *G02F 1/1309* (2013.01)
  USPC ............ 356/416; 356/400; 356/402; 356/419

(56) References Cited

U.S. PATENT DOCUMENTS

| | | | |
|---|---|---|---|
| 7,186,969 B2 | 3/2007 | Shimomura et al. | |
| 7,286,232 B2 | 10/2007 | Bouzid | |
| 7,435,945 B2 | 10/2008 | Shimomura et al. | |
| 7,570,433 B2 | 8/2009 | Shimomura et al. | |
| 7,911,607 B2 | 3/2011 | Matsuura | |
| 7,940,394 B2 | 5/2011 | Sato | |
| 2003/0038938 A1* | 2/2003 | Jung et al. | 356/419 |
| 2004/0173737 A1 | 9/2004 | Shimomura et al. | |
| 2004/0178333 A1 | 9/2004 | Shimomura et al. | |
| 2006/0146330 A1* | 7/2006 | Maniam | 356/405 |
| 2007/0018084 A1 | 1/2007 | Shimomura et al. | |
| 2007/0188760 A1 | 8/2007 | Bouzid | |
| 2007/0215797 A1 | 9/2007 | Shimomura et al. | |
| 2009/0080194 A1 | 3/2009 | Bouzid et al. | |
| 2009/0110333 A1 | 4/2009 | Matsuura | |
| 2009/0323057 A1* | 12/2009 | Chen et al. | 356/301 |
| 2010/0128264 A1* | 5/2010 | Hoenicka et al. | 356/300 |
| 2010/0149536 A1* | 6/2010 | Sato | 356/419 |
| 2010/1014953 | 6/2010 | Sato | |

FOREIGN PATENT DOCUMENTS

| | | |
|---|---|---|
| JP | 2003-247891 | 9/2003 |
| JP | 2009-109315 | 5/2009 |
| JP | 2009-300257 | 12/2009 |
| JP | 2010-002255 | 1/2010 |
| JP | 2010-025558 | 2/2010 |
| WO | WO 2005/090923 | 9/2005 |
| WO | WO 2007-094782 | 8/2007 |
| WO | WO 2009/028398 | 3/2009 |

* cited by examiner

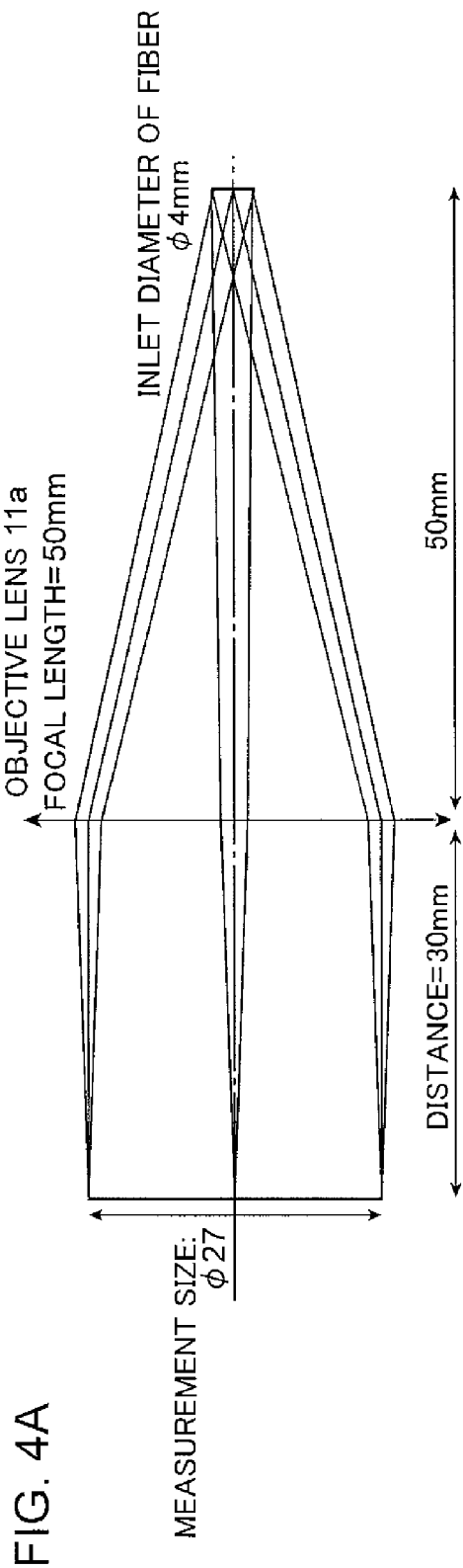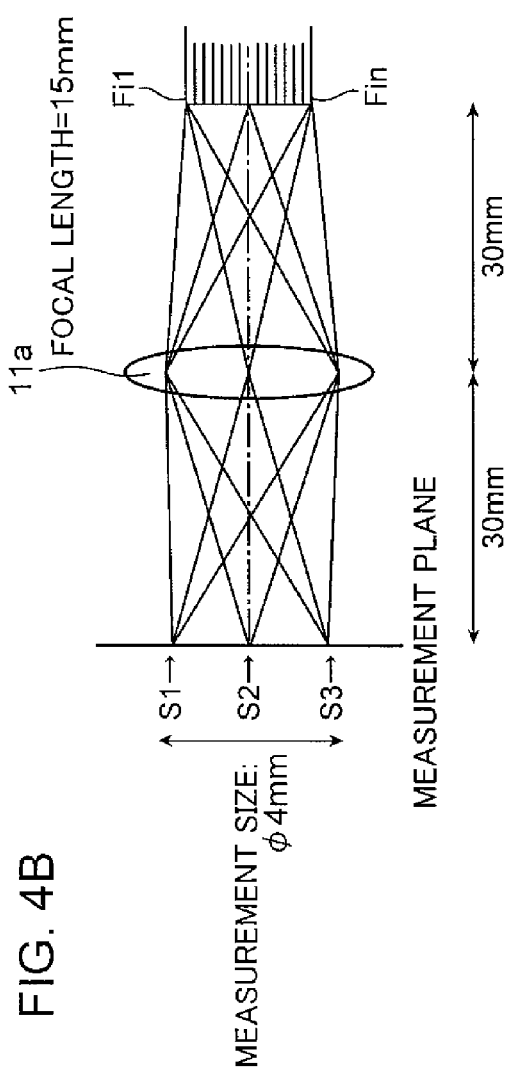
FIG. 4A
FIG. 4B

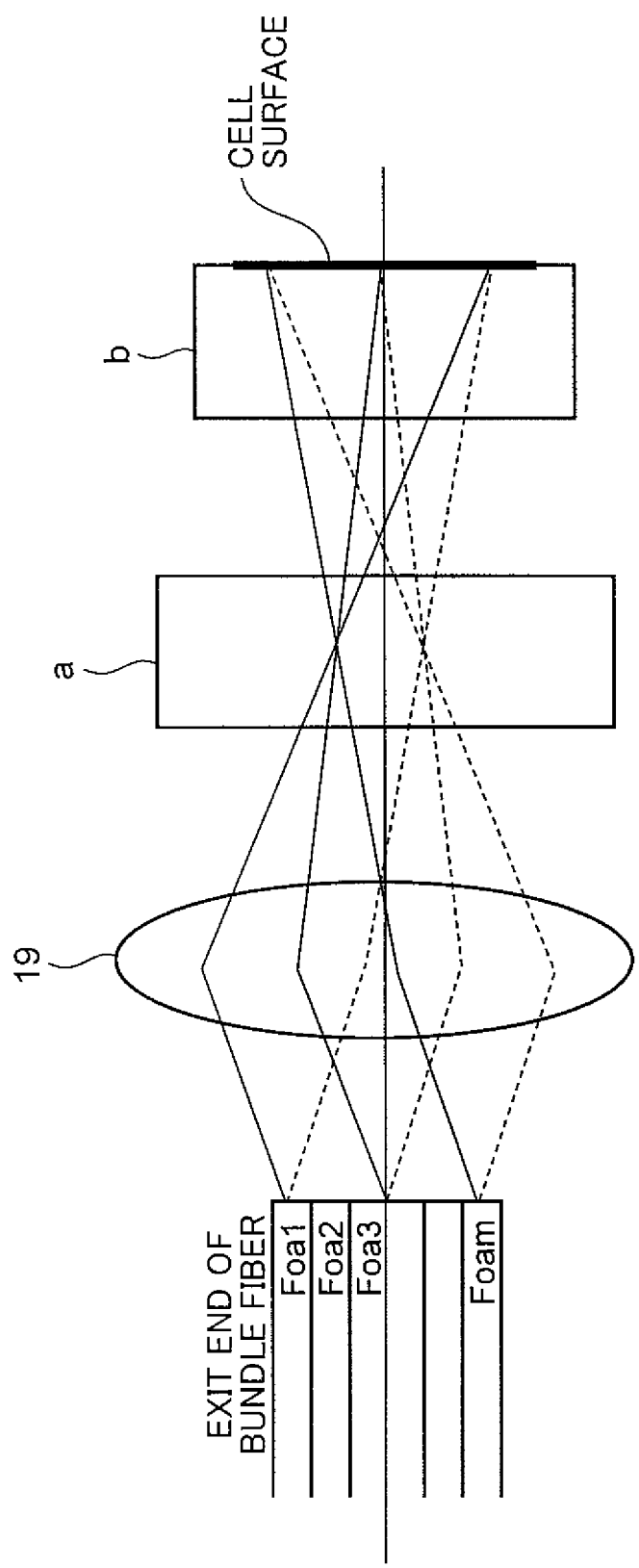

MEASURING OPTICAL SYSTEM, AND COLOR LUMINANCE METER AND COLORIMETER USING THE SAME

RELATED APPLICATIONS

This is a U.S. National Phase Application under 35 USC 371 of International Application PCT/JP2011/001346 filed on Mar. 8, 2011.

This application claims the priority of Japanese Application No. 2010-083954 filed Mar. 31, 2010, the entire content of which is hereby incorporated by reference.

TECHNICAL FIELD

The present invention relates to a measuring optical system for use, for example, in a color luminance meter for receiving light emitted from a light source such as a liquid crystal monitor and a lamp to measure a luminance (Lv) and a chromaticity (x, y) of the light source or a colorimeter for receiving light emitted onto and then reflected by a measuring object to measure a reflectance and a chromaticity (Lab, etc.) of the measuring object, and a color luminance meter and a colorimeter each using the measuring optical system.

BACKGROUND ART

A color luminance meter for measuring a luminance (Lv) and a chromaticity (x, y) of a liquid crystal monitor is configured by equipping it, for example, with a measuring probe disposed opposed to a display screen of the liquid crystal monitor, and a main meter unit. The measuring probe is operable to measure, for example, tristimulus values of X, Y, Z color-matching functions defined by the CIE (International Commission on Illumination), by respective sensors, and the main meter unit is operable, based on a result of the measurement, to calculate a luminance and a chromaticity of the display screen as a measuring object.

A typical conventional technique related to a measuring optical system for use in such a color luminance meter or a colorimeter is disclosed, for example, in the following Patent Document 1.

In the Patent Document 1, a bundle fiber is employed to introduce incident light into three colorimetric optical systems corresponding to respective ones of the tristimulus values. Each of the colorimetric optical systems is configured by combining a color filter corresponding to a respective one of the tristimulus values, with a light-receiving sensor, wherein each of the color filters of the colorimetric optical systems is disposed at a respective one of three branched exit end of the bundle fiber. The bundle fiber of the Patent Document 1 is circumferentially divided into six groups as viewed from the side of an circularly-bundled inlet end, wherein each pair of diagonally located ones of the groups are bundled together. This facilitates the mitigation of measurement errors resulting from directivity (luminous intensity distribution characteristic).

However, each of the color filters is configured by laminating a plurality of optical absorption filters in such a manner as to transmit incident light at a transmittance corresponding to a respective one of a plurality of desired spectral characteristics such as the tristimulus values X, Y, Z, so that there is a problem that it is impossible to design a filter having a characteristic with transmittance peaks in two wavelength bands, as illustrated, for example, in FIG. 21, in other words, design freedom or flexibility is limited. There is another problem of low transmittance and large light intensity loss. Particularly, in a film-shaped color filter, there is yet another problem of severe aged deterioration due to (poor stability against) heat, light (ultraviolet light), temperature, etc.

Therefore, a conventional technique intended to employ, as each of the color filters, an interference type filter (hereinafter referred to as "interference filter") in place of the optical absorption filter is proposed, for example, in the following Patent Document 2. This interference filter is configured by laminating several tens of dielectric layers or oxide layers on a glass substrate through vacuum deposition, spattering or other process, and operable to select a transmission/reflection wavelength by the action of optical interference.

However, in the interference filter, a transmittance thereof varies depending on incident angles. Thus, there is a problem that, in the case of 0-degree incidence of parallel light, error sensitivity is high.

LIST OF PRIOR ART DOCUMENTS

Patent Documents

Patent Document 1: JP 2003-247891 A
Patent Document 2: JP 2010-002255 A

SUMMARY OF THE INVENTION

The present invention has been made in view of the above circumstances, and its object is to provide a measuring optical system capable of employing an interference filter while reducing an influence of a deviation in transmittance characteristic thereof due to an incident angle, and a color luminance meter and a colorimeter each using the measuring optical system.

In a measuring optical system of the present invention, and a color luminance meter and a colorimeter of the present invention each using the measuring optical system, measuring light is split into two or more, and, before each split light is received by a respective one of two or more light-receiving sensors through a respective one of two or more interference filters, it is introduced into the interference filter through a respective one of two or more collecting lens groups each formed as a substantially bilateral telecentric system. Each of the interference filters is formed to obtain a transmittance characteristic corresponding to a measurement parameter, according to a condition of an intensity distribution with respect to incident angles of light incident on the interference filter. Thus, the measuring optical system of the present invention and the color luminance meter and the colorimeter of the present invention each using the measuring optical system can employ an interference filter while reducing an influence of a deviation in transmittance characteristic thereof due to an incident angle.

The above and other objects, features and advantages of the present invention will be apparent from the following detailed description and the accompanying drawings.

BRIEF DESCRIPTION OF THE DRAWINGS

FIG. 4 is a ray diagrams of an objective lens of the measuring probe illustrated in FIG. 1.

FIG. 25 is a diagram for schematically explaining a configuration of an optical system according to a third embodiment, in which an interference filter is employed in the measuring optical system illustrated in FIG. 17, in combination of a collecting lens.

DESCRIPTION OF EMBODIMENTS

Figure 1:
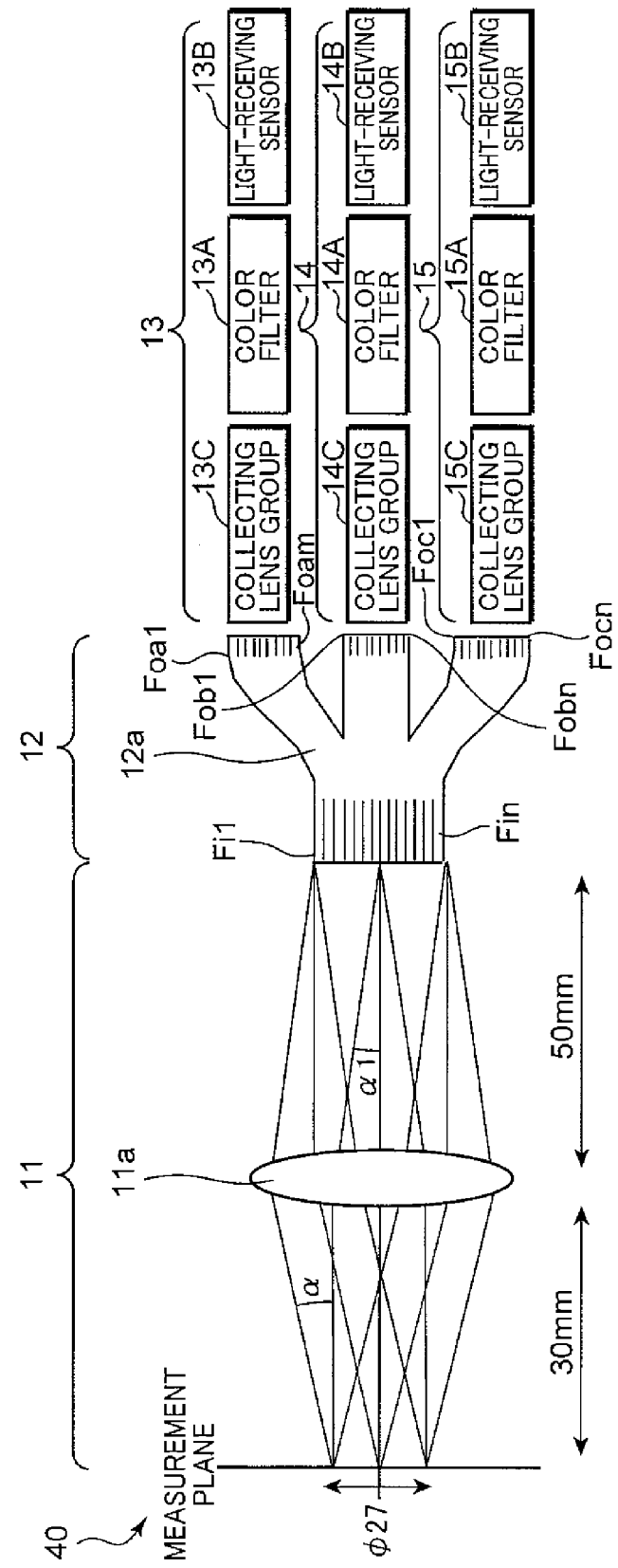
FIG. 1 is a diagram illustrating an internal configuration of a measuring probe (illustrating a measuring optical system) of a color luminance meter according to one embodiment of the present invention.

An embodiment of the present invention will hereinafter be described based on the drawings. In the figures, elements or components assigned with the same reference numeral or code mean that they have the same configuration, and duplicated description thereof will be appropriately omitted. Further, in this specification, a collective term will be denoted by a reference numeral or code from which a suffix is omitted, and a term indicative of an individual element or component will be denoted by a reference numeral or code with a suffix.

Comparative Examples

Figure 14:
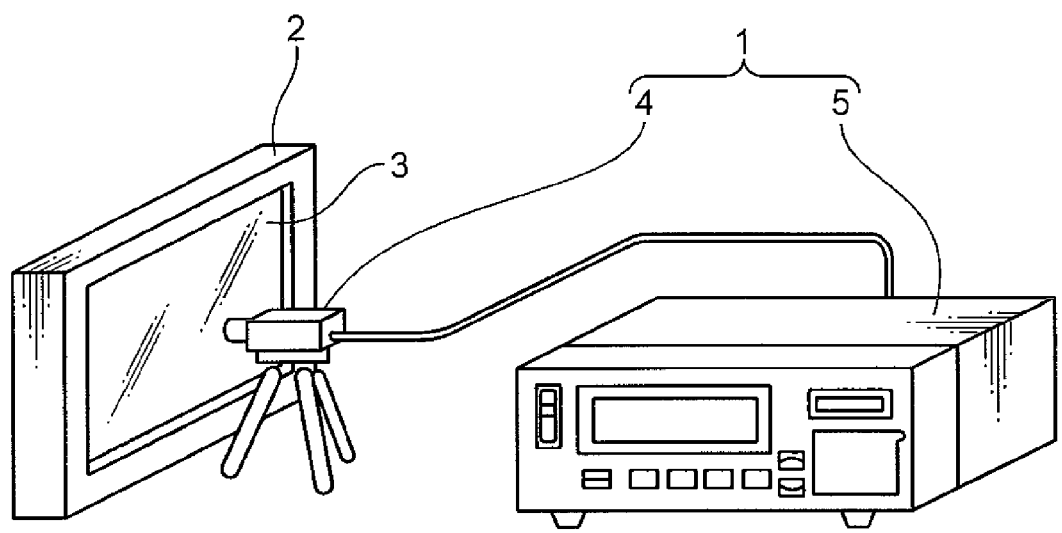
FIG. 14 is a diagram for explaining a method of measuring a liquid crystal monitor by a color luminance meter.

First of all, in order to explain functions and effects of this embodiment, a comparative example will be described below. FIG. 14 is a diagram for explaining a state of measurement of luminance (Lv) and chromaticity (x, y) of a liquid crystal monitor 2 using a color luminance meter 1. This color luminance meter 1 is configured by equipping it with a measuring probe 4 disposed opposed to a display screen 3 of the liquid crystal monitor 2, and a main meter unit 5. The measuring probe 4 is operable to measure, for example, tristimulus values of X, Y, Z color-matching functions defined by the CIE, by respective sensors, and the main meter unit 5 is operable, based on a result of the measurement, to calculate a luminance and a chromaticity of the display screen 3 as a measuring object.

Figure 15:
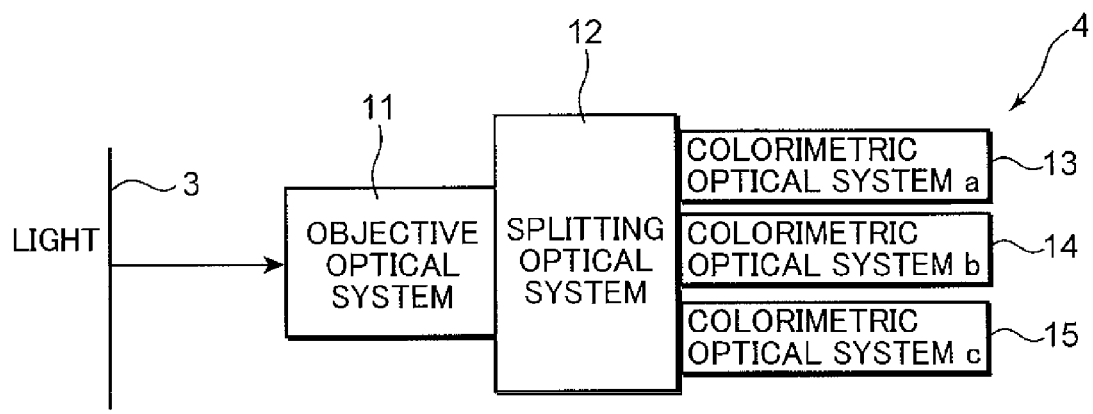
FIG. 15 is a block diagram illustrating a schematic configuration of a measuring probe of the color luminance meter.

A schematic configuration of the measuring probe 4 is as illustrated, for example, in FIG. 15. Specifically, the measuring probe 4 is configured such that an objective optical system 11 receives light emitted from the display screen 3 as a measuring object to extract a component thereof incident at a prescribed angle, e.g., within ±2.5 degrees with respect to a normal line of the display screen 3, and allow the extracted component to become incident on a splitting optical system 12, wherein the component is split into three, and the split components are introduced, respectively, into three colorimetric optical systems 13, 14, 15 corresponding to tristimulus values of X, Y, Z color-matching functions, to measure an intensity of the incident light.

Figure 16:
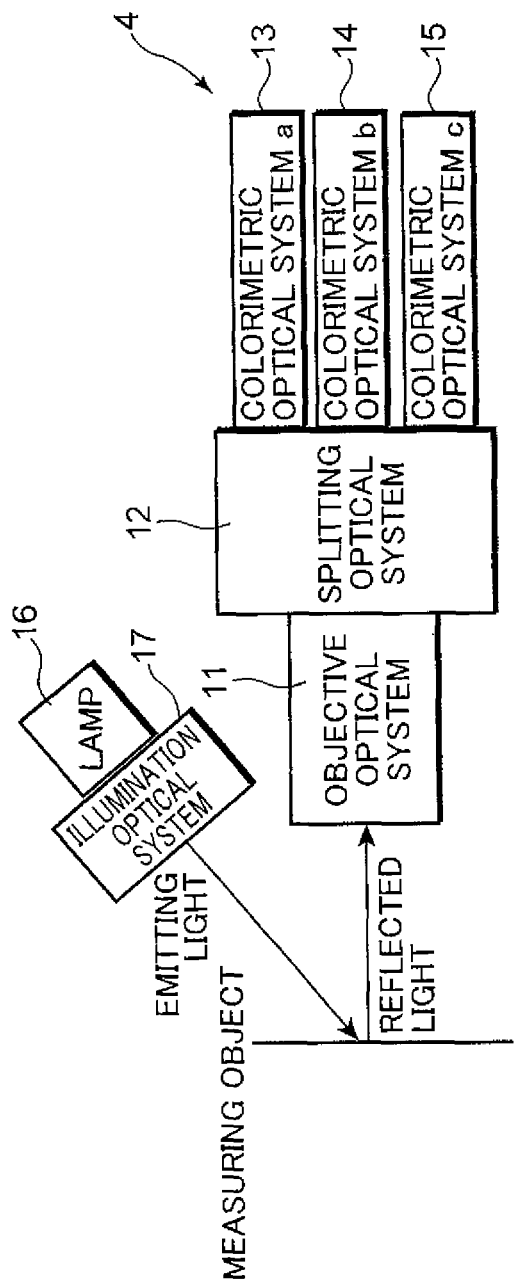
FIG. 16 is a block diagram illustrating a schematic configuration of a measuring probe of a colorimeter.

On the other hand, in a colorimeter for measuring a reflectance and a chromaticity (Lab, etc.) of the measuring object, in addition to the configuration of the measuring prove 4 illustrated in FIG. 15, a lamp 16 as a light source and an illumination optical system 17 are further provided, as illustrated, for example, in FIG. 16. Light is emitted from the lamp 16 and the illumination optical system 17 onto the measuring object, and resulting reflected light is measured by the measuring probe 4.

Figure 17:
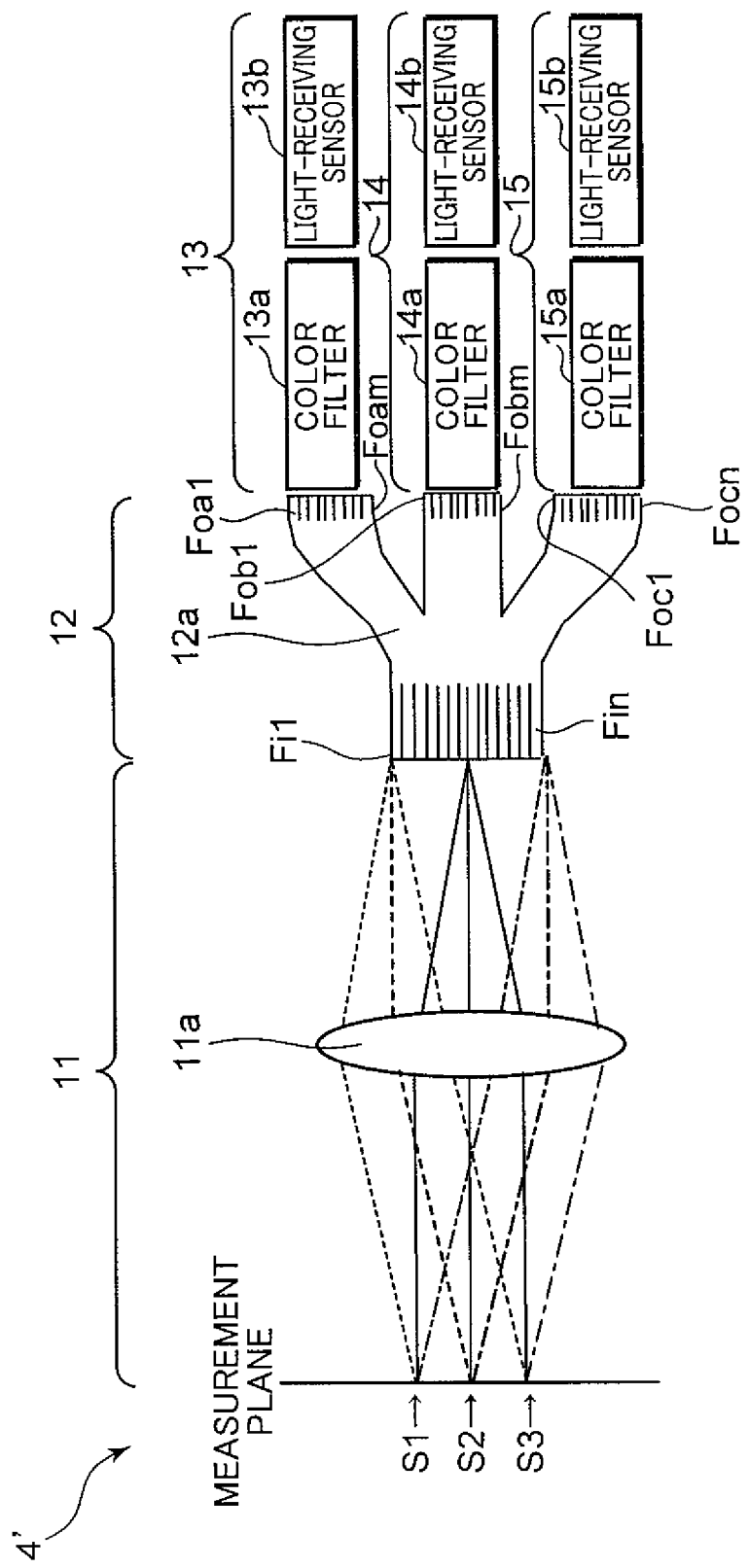
FIG. 17 is a diagram illustrating an internal configuration of a measuring probe (illustrating a measuring optical system) of a conventional art color luminance meter.

A typical technique related to a measuring optical system for use in such a color luminance meter or colorimeter is disclosed in the Patent Document 1. FIG. 17 is a diagram illustrating an internal configuration of a measuring probe 4' in the technique. In this technique, the measuring probe 4' is provided with an objective optical system 11, a splitting optical system 12 and a colorimetric optical system 13. A convex lens 11a having a positive power is used for the objective optical system 11, and a bundle fiber 12a is used for the splitting optical system 12. The bundle fiber 12a is comprised of a plural number n (n=several hundreds to several thousands) of fiber strands (fiber elements) with a small diameter (φ=about 0.03 to 0.3 mm), and formed such that the fiber strands are bundled together on an inlet end (inlet) side thereof, and randomly branched into two or more sub-bundles (e.g., three sub-bundles corresponding to the tri-stimulus values X, Y, Z) each consisting of a plural number m of the fiber strands, on an exit end (exit) side thereof. Each of the entry and exit sides may have an arbitrary shape (such as a circular shape or a rectangular shape).

In the measuring probe 4', a non-illustrated aperture stop is disposed at a position of a back focal point of the convex lens 11a so as to capture a component within ±2.5 degrees with respect to the normal line of the display screen 3 as mentioned above, i.e., in a front (object-side) telesentric optical configuration. The inlet end (Fi1 to Fin) of the bundle fiber 12a faces a plane of the aperture stop. Each of the colorimetric optical systems 13, 14, 15 comprises a color filter 13a (14a, 15a) corresponding to a respective one of the tri-stimulus values X, Y, Z, and a light-receiving sensor 13b (14b, 15b) in combination therewith.

Figure 18:
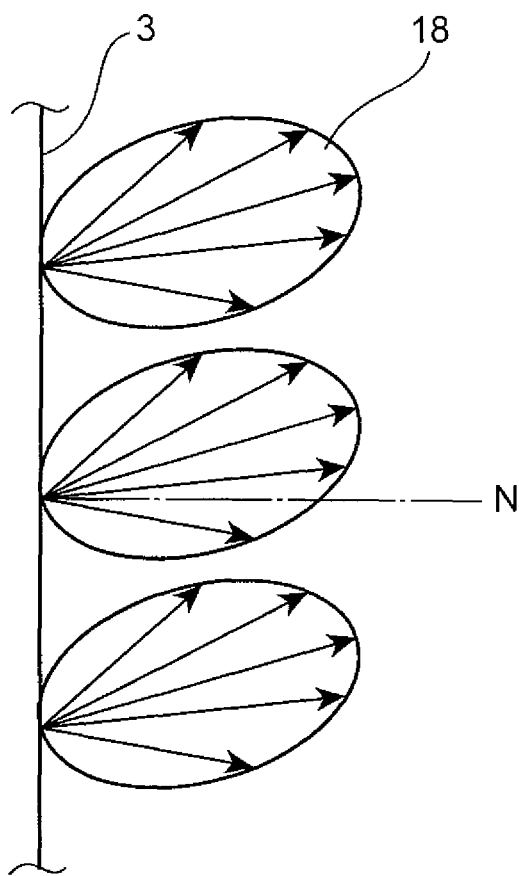
FIG. 18 is a diagram for explaining a luminance intensity distribution of the liquid crystal monitor.
Figure 19:
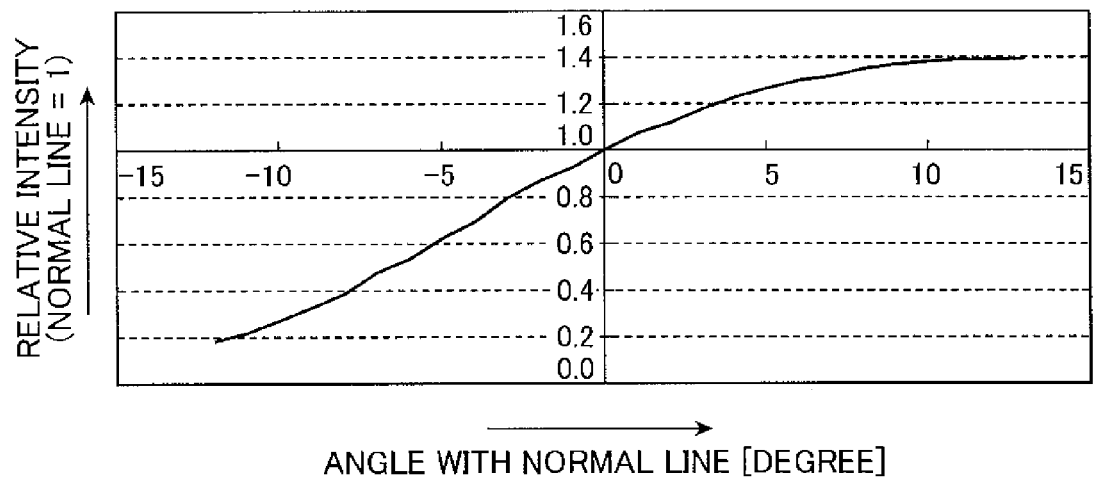
FIG. 19 is a graph illustrating one example of the luminance intensity distribution of the liquid crystal monitor.

Meanwhile, for example, in a liquid crystal monitor, a first characteristic of a measuring object is that a luminous intensity distribution of the measuring object has directivity. That is, an intensity of emitted light varies depending on an angle with respect to the normal line of the display screen 3, and, in some cases, can be asymmetric with respect to the normal line. For example, in monitors for notebook computers and portable phones, some of them are designed to intentionally strengthen directivity, and it is often the case that a user peers down at the monitor of the notebook computer obliquely from thereabove. For this reason, as illustrated in FIG. 18, the display screen 3 has a luminous intensity distribution 18 in which a luminous intensity becomes higher on an upper side and becomes lower on a lower side, with respect to a normal line N. FIG. 19 specifically illustrates one example of such a luminous intensity distribution.

Figure 20:
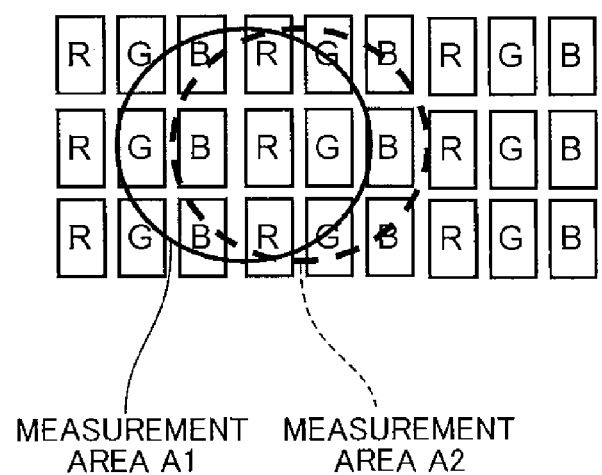
FIG. 20 is a diagram illustrating a relationship between an arrangement of pixels for R, G and B and a measurement area in the liquid crystal monitor.

Further, in the liquid crystal monitor, an emission intensity varies depending on a measurement position (unevenness in intensity occurs). This phenomenon occurs due to a positional relationship between a backlight and/or an array of RGB filters, and the measuring probe 4. FIG. 20 illustrates a relationship between an array of R, G and B pixels of a liquid crystal monitor, and a measurement area. For example, with a focus on a central row, two G pixels, one R pixel and one B pixel are included in a measurement area A1 indicated by the solid line, whereas two B pixels, one R pixel and one G pixel are included in a measurement area A2 indicated by the broken line which is shifted from the measurement area A1 by one pixel in a row direction of the pixels. Such unevenness in intensity is significant in the case where the measurement area is small (for example, $\phi=5$ mm or less).

Furthermore, the measuring object (liquid crystal monitor) has an asymmetric characteristic, and, on the other hand, a measuring instrument is required to provide stable measurement results. In other words, it is necessary that a measurement result is not changed even when the measuring probe 4 is rotated about an optical axis (no rotation-induced error occurs). This phenomenon occurs not only in measurement for a liquid crystal monitor but in measurement for a glossy printed material or a coated surface with metallic or pearl paint, using a colorimeter for measuring reflected light.

Therefore, in the Patent Document 1, the bundle fiber 12a is configured such that a plurality of fiber strands are circumferentially divided into six groups as viewed on the side of a plurality of inlet ends Fi1 to Fin thereof bundled in a circle, and diagonally located ones of the groups are bundled together. This facilitates the mitigation of measurement errors due to the above directivity (luminous intensity distribution characteristic).

However, each of the color filters 13a, 14a, 15a is configured by laminating a plurality of optical absorption filters in such a manner as to transmit incident light at a transmittance corresponding to a respective one of a plurality of desired spectral characteristics such as the tri-stimulus values X, Y, Z. Therefore, this configuration has a problem that it is unable to design a filter having two transmittance peaks in respective wavelength bands, as illustrated, for example, in FIG. 21, in other words, flexibility of filter design is limited. There is another problem of low transmittance and large light intensity loss. Particularly, in a film-shaped color filter, there is yet another problem of severe aged deterioration due to (poor stability against) heat, light (ultraviolet light), humidity, etc.

Figure 21:
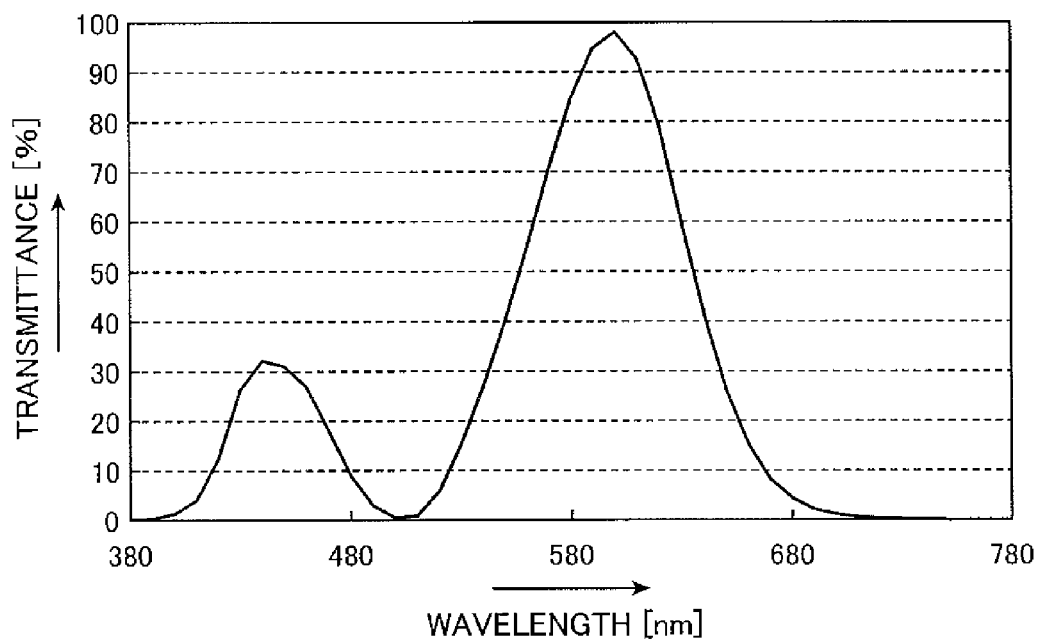
FIG. 21 is a graph illustrating one example of a spectral transmittance characteristic of the interference filter.

Therefore, a conventional technique intended to employ, as each of the color filters 13a, 14a, 15a, an interference filter (hereinafter referred to as "interference filter") in place of the optical absorption filter is proposed, for example, in the Patent Document 2. This interference filter is configured by laminating several tens of dielectric layers or oxide layers on a glass substrate through vacuum deposition, spattering or other process, and operable to select a transmission/reflection wavelength by the action of optical interference. Thus, the interference filter is easy to obtain a desired transmittance (easy to design or excellent in design flexibility) as compared to the optical absorption filter, so that it can be formed as a filter (as illustrated in FIG. 21) having two peaks (vertexes) as in the X color-matching function. In addition, the interference filter has a high transmittance. For example, a peak transmittance is 50% or less in the absorption type, whereas it is close to 100% in the interference filter. The interference filter further has an advantage that it is excellent in reliability (small in a temporal change in transmittance due to temperature, humidity and exposure to light).

Figure 22:
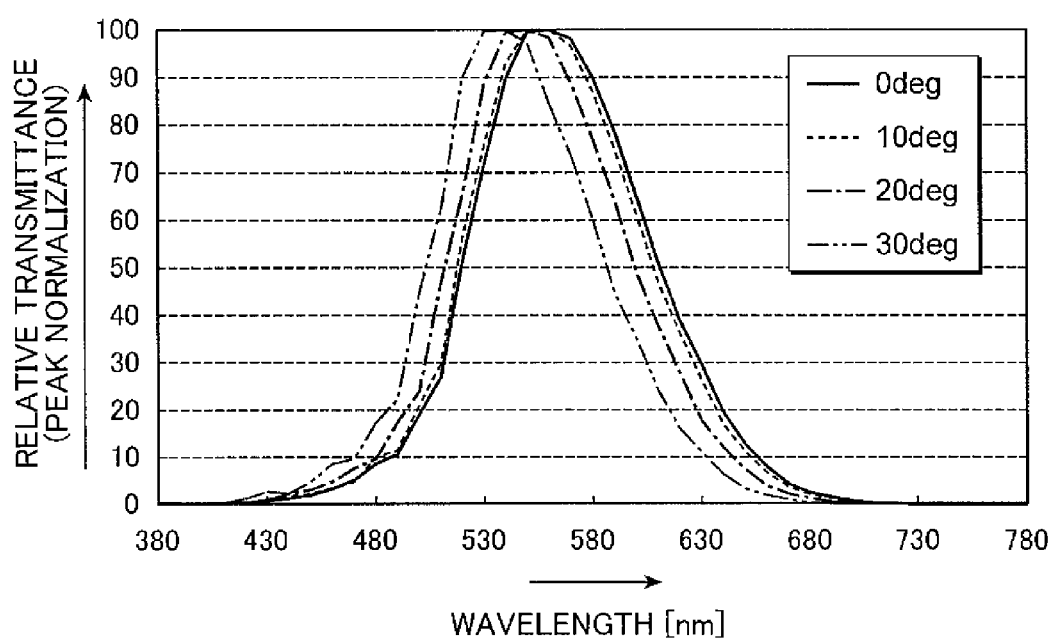
FIG. 22 is a graph illustrating a change in the spectral transmittance characteristic in response to a change in incident angle onto the interference filter.

On the other hand, in the interference filter, a transmittance thereof varies depending on incident angles. Thus, there is a problem that, in the case of 0-degree incidence of parallel light, error sensitivity is high, which lead to a disadvantage that an optical system for allowing incidence of parallel light becomes complicated. FIG. 22 illustrates a relationship between an incident angle of light onto the interference filter, and a transmittance. In the case of the 0-degree incidence, as the incident angle is largely deviated from the normal line of the interference filter, a transmittable wavelength band shifts toward a shorter-wavelength side. Consequently, a transmittance characteristic will vary just by a slight inclination due to error in positional relationship between related components.

Therefore, a requirement for the interference filter is that an intensity distribution with respect to incident angles is kept stable, and each of the incident angles does not have unique information (each of the incident angles needs to have uniformized (normalized) information). Thus, in order to meet this requirement, in the Patent Document 2, the objective lens system 11 is provided with two lenses and an aperture stop disposed therebetween, and configured such that an incident angle at the inlet end (Fi1 to Fin) of the bundle fiber 12a becomes less than an incident angle to the aperture stop, thereby reducing divergence of incident angles from the bundle fiber 12a onto the interference filter to compensate the disadvantage of the interference filter.

In order to allow a component within ±2.5 degrees with respect to the normal line of the display screen 3 to be extracted and introduced into the splitting optical system 12, the objective lens system 11 is laid out in a front telecentric optical arrangement. Thus, due to information associated with each of the fiber strands and information associated with incident angles onto each of the fiber strands, it is still difficult to uniformize incident light onto the color filters 13a, 14a and 15a. The reason will be described in detail below.

Firstly, as the information associated with each of the fiber strands, an emission angle from a measurement plane (directivity) is correlated with each of the fiber strands. Specifically, as mentioned above in connection with FIG. 17, light emitted upwardly from the measurement plane (broken lines) is totally collected on the inlet end Fi1 of an upper one of the fiber strands. Thus, if a large number of fiber strands are randomly arranged at the three sub-bundles of exit ends (Foa1 to Foam; Fob1 to Fobm; Foc1 to Focm) of the bundle fiber 12a, information about the directivity is uniformized. However, it is difficult to fabricate such a bundle fiber. Even if it is possible, a resulting bundle fiber cannot avoid high cost. It is practically impossible to figure out where each of the fiber strands is arranged on the side of the exit ends of the bundle fiber 12a, and the fiber strands are unevenly arranged (for example, information about directivity around 0 degree is concentrated on an outer periphery of the exit end of the fiber sub-bundle). Moreover, even in a plurality of measuring instruments of the same model, the uneven state varies individually.

Secondly, as for the information associated with incident angles onto each of the fiber strands, assuming that incident angles onto each of the fiber strands are correlated with respective positions in the measurement plane, as mentioned above (in FIG. 17, light emitted from S1 continually becomes incident on the fiber at constant angles), and a length of the fiber is sufficiently short, the following relation is satisfied: incident angle=±output angle, so that information associated with the incident angles is kept in output angles (including the case where the sign is revered), because light is transmitted through each of the fiber strands while repeatedly undergoing total reflection based on a difference in refraction index between a core and a clad of the fiber strand.

Figure 26A:
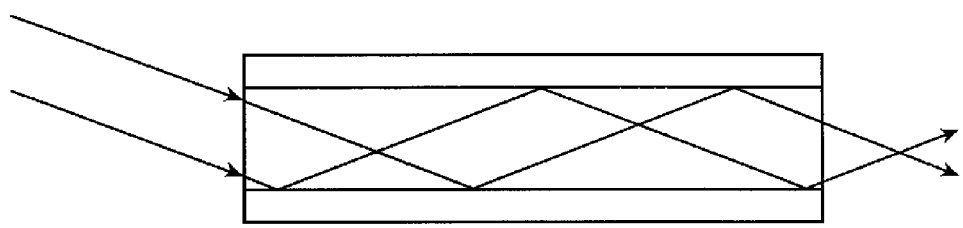
FIG. 26 is a sectional view for explaining a state of light propagation within an optical fiber.
Figure 26B:
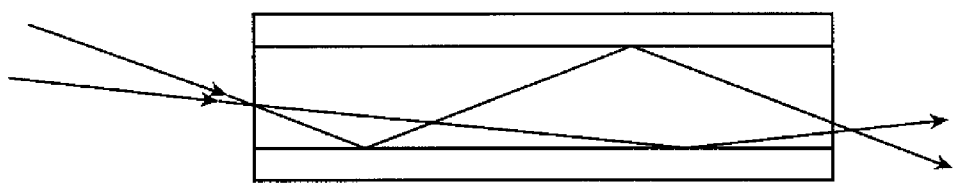

On the other hand, if the fiber has a certain level or more of length, the incident angles are randomly uniformized during transmission through the fiber (during a large number of times of reflections between the core and the clad), so that the problem with the incident angles is reliably solved as the fiber length becomes longer (as the number of times of reflection becomes larger). This is because, although an optical fiber is ideally operable to cause incident light to undergo total reflection based on a difference in refraction index between a core and a clad, as illustrated in FIG. 26($a$), output positions and output angles practically become random, as illustrated in FIG. 26($b$), due to a local difference in refraction index (stria), a local difference in fiber diameter (thick, thin), or a curve of a reflection interface caused by bending of the fiber.

As above, when the fiber has a certain level or more of length, a diffusion effect similar to that of a diffusion plate can be obtained (a decrease in light intensity is less than that in the diffusion plate), so that incident light is uniformized and then output. Along with an increase in the fiber length, a distribution of the output angles comes closer to a numerical aperture (NA) specific to the fiber. In other words, incident light is output under the fiber-specific NA, regardless of incident angles onto the fiber. Therefore, the Patent Document 2 has a contradiction in this regard. Specifically, in order to reduce an output angle from a fiber (to reduce an incident angle onto each of the color filters 13a, 14a, 15a), it is necessary to form the bundle fiber using short fibers with a certain level or less of length. However, the short fibers cause an uneven distribution of information associated with incident angles onto the fiber, resulting in the occurrence of measurement error.

Further, it is necessary to receive all light beams under the same conditions (without relying on incident angles onto each of the interference filters). However, each of a plurality of light beams output from the bundle fiber 12a has specific information about the measuring object as described above, so that it is necessary to allow the light beams to pass through the color filters 13a, 14a, 15a under the same condition and without losing the information, and then received by the light-receiving sensors 13b, 14b, 15b. Assume that light is received in a situation where a part of the information is lost. In this case, when the measuring probe 4 is rotated as described above, resulting received data is changed in conjunctions with the rotation (rotation-induced error). Further, if conditions of the loss vary depending on measuring instruments, instrumental error occurs (a difference in measured result occurs among a plurality of measuring instruments of the same model).

Figure 23:
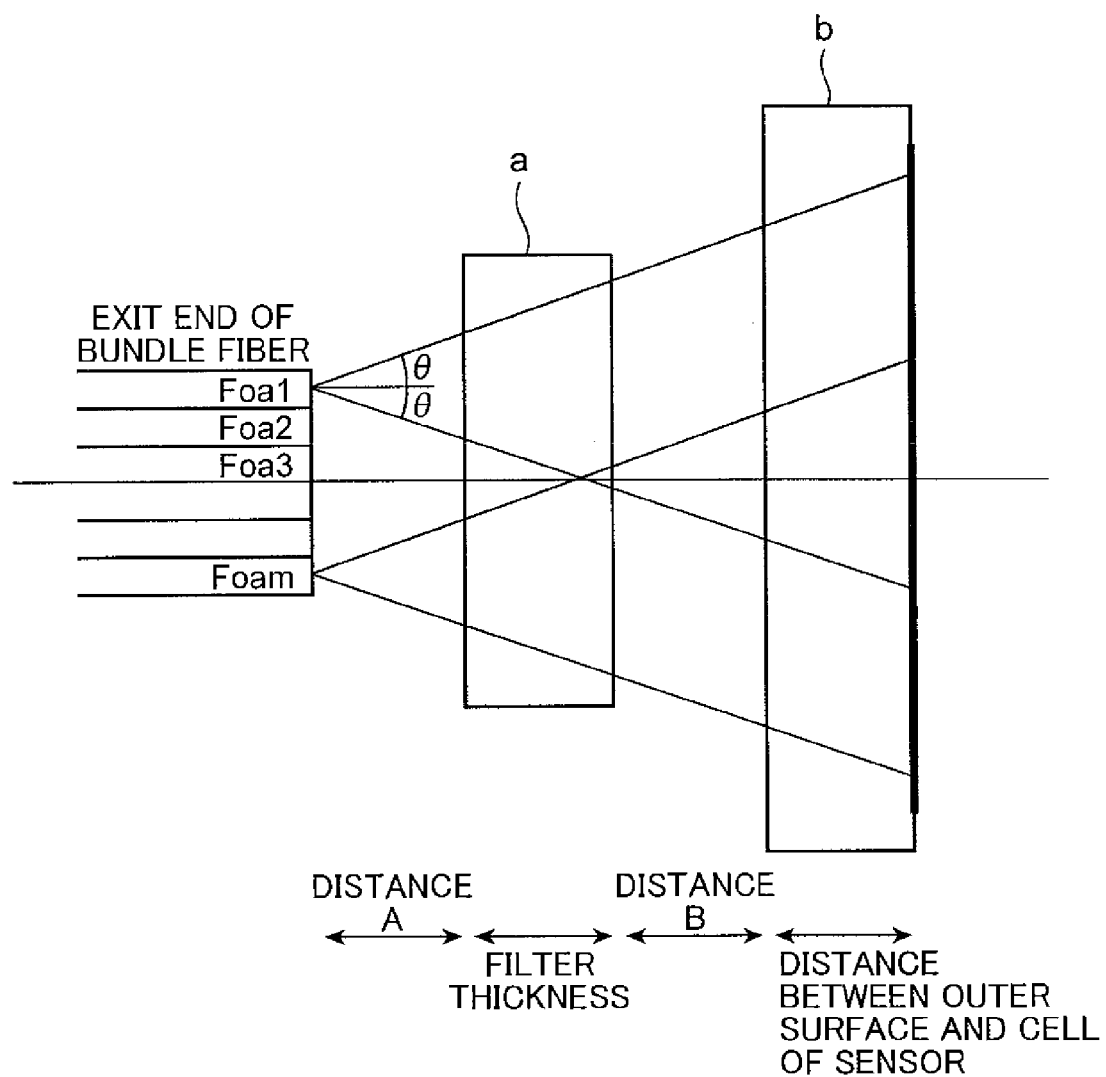
FIG. 23 is a diagram for schematically explaining a configuration of an optical system according to a first embodiment, in which an interference filter is employed in the measuring optical system illustrated in FIG. 17, without using a collecting lens.

On this account, in the case of receiving all light beams (the above information), if it is attempted to perform it without any collecting lens, a color filter a and a light-receiving sensor b opposed to the fiber sub-bundle on the side of the outlet end (Foa1 to Foam) of the bundle fiber 12a are increased in size, and distances A, B therebetween are increased, as illustrated in FIG. 23, causing a huge problem with size (space) and cost. Cost of the color filter a and the light-receiving sensor b becomes higher along with an increase in size thereof. Thus, there is a need for forming them in a size reduced as much as possible.

For example, when a diameter $\phi$ of the fiber sub-bundle on the side of the exit end (Foa1 to Foam) is 2.3 mm and an outlet angle $\theta$ from the fiber is ±40 degrees. The distance A between the exit end (Foa1 to Foam) and the color filter a is 1 mm; a thickness of the color filter a is 1 mm; the distance B between the color filter a and the light-receiving sensor b is 1 mm; a distance from an outer surface to a light-receiving cell of the light-receiving sensor b is 1 mm. Thus, in the case where the total thickness is 4 mm, a cell size of the light-receiving sensor b (in a rectangular-shaped cell, a length of an end surface) becomes huge, specifically, (1.15+tan 40 degrees× 4)×2=9.0 mm.

Figure 24:
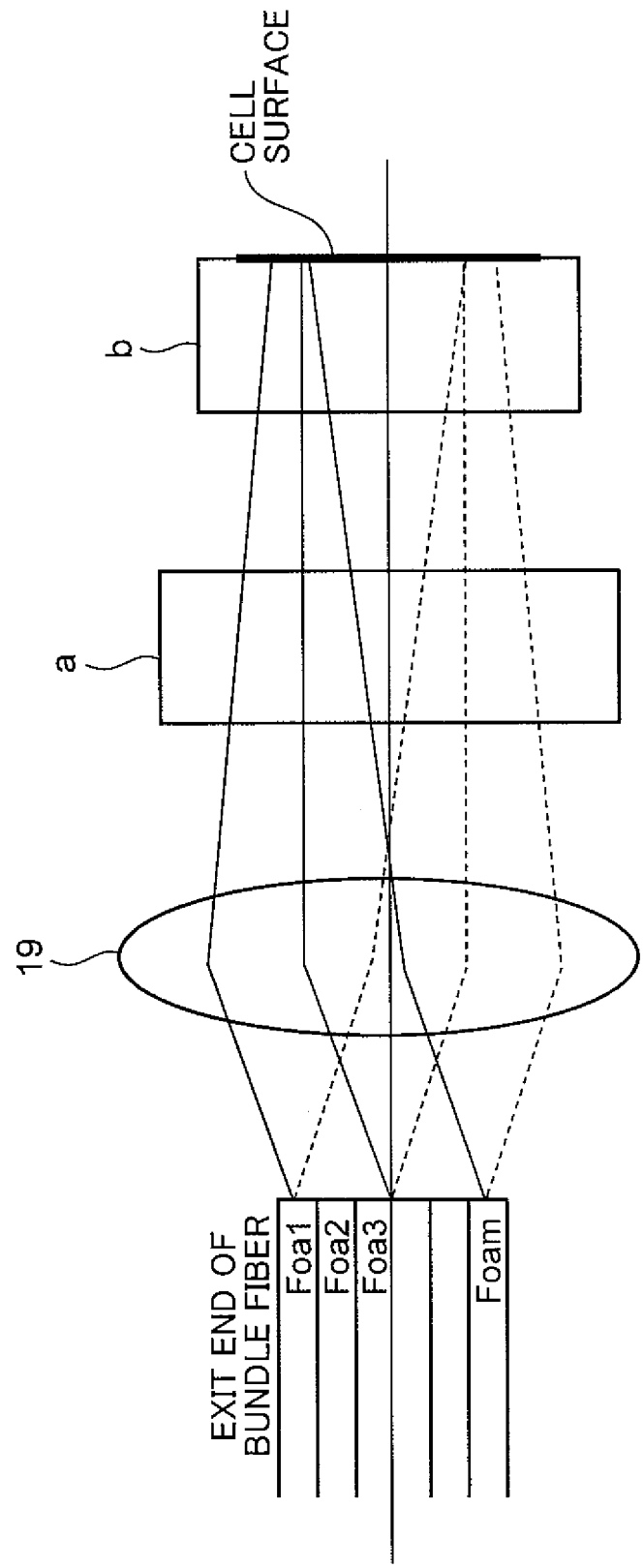
FIG. 24 is a diagram for schematically explaining a configuration of an optical system according to a second embodiment, in which an interference filter is employed in the measuring optical system illustrated in FIG. 17, in combination of a collecting lens.

On the other hand, in the case of receiving all light beams (the above information) as mentioned above, in order to form the color filter a and the light-receiving sensor b in a size reduced as much as possible, it is conceivable to receive light after collecting it through a collecting lens. A configuration in this case is illustrated in FIGS. 24 and 25. FIG. 24 illustrates an example in which a collecting lens 19 is used to cause the light beam to become incident on the light-receiving sensor b in the form of parallel light, and FIG. 25 illustrates an example in which a collecting lens 19 is used to form an image on the light-receiving sensor b. However, the use of an interference filter as the color filter b in this configuration causes a problem that it is influenced by the information associated with each of the fiber strands and the information associated with incident angles onto the fiber strand as mentioned above.

More specifically, as for the information associated with each of the fiber strands, light beams output from the fiber strands become incident on the color filter a at different angles, respectively, so that light-receiving sensitivities to respective light beams output from the fiber strands having different information become different from each other. That is, as illustrated in FIGS. 24 and 25, an incident angle onto the color filter 12a varies between light output from the exit end Foa1 and light output from the exit end Foam.

As for the information associated with incident angles onto each of the fiber strands, when the fiber is short in length, light is output while maintaining the information associated with the incident angles, as mentioned above. Thus, as illustrated in FIGS. 24 and 25, output angles from each of the fiber strands reflect the incident angles and keep them as indicated by the solid and broken lines, which also leads to a variation in the incident angle onto the color filter. However, when the fiber is sufficiently long in length, such a problem never occurs, because the incident angles are randomly mixed during passing through the fiber, so that output angles from each of the fiber strand are converted into uniformized (normalized) information. However, light is output under a fiber-specific NA, as mentioned above.

Embodiment 1

An embodiment will be described below. FIG. 1 is a diagram illustrating an internal configuration (measuring optical system) of a measuring probe 40 according this embodiment. This measuring probe 40 is used as the measuring probe 4 of the color luminance meter illustrated in FIG. 15 or of the colorimeter illustrated in FIG. 16. As one example of a measurement method, a color luminance meter is configured by equipping it with the measuring probe 40 disposed opposed to a display screen 3 of a liquid crystal monitor 2, and a main meter unit 5 for obtaining a color and a luminance based on an output of the measuring probe 40, in the same manner as that mentioned above in connection with FIG. 14. As another example of the measurement method, a colorimeter is configured by equipping it with a measuring light illumination unit for emitting measuring light to a measuring object, a measuring probe 40 for measuring reflected light which is the measuring light reflected from the measuring object, and a main meter unit for obtaining a color based on an output of the measuring probe 40 in the same manner as that mentioned above in connection with FIG. 16. In this schematic block diagram of the measuring probe 40, the measuring probe 40 is similar to the measuring probe 4' illustrated in FIG. 17, and therefore a corresponding element or component is denoted by assigning the same reference number or code thereto.

More specifically, the measuring probe 40 comprises an objective optical system 11 for receiving light from a measuring object, a splitting optical system 12 for splitting light output from the objective optical system 11 into two or more, and two or more measuring optical systems 13, 14, 15 each provided in corresponding relation to a respective one of two or more exit ends of the splitting optical system 12 and adapted to detect light output from the exit end. The objective optical system 11 is configured using a biconvex lens 11a having a positive optical power (refractive power, a reciprocal of a focal length), and the splitting optical system 12 is configured using a bundle fiber 12a formed by bundling a plurality of fiber strands, wherein light output from the objective optical system 11 becomes incident on one end of the bundle fiber 12a, and the plurality of fiber strands are divided into two or more sub-bundles on the side of the other end. Further, a non-illustrated aperture stop is disposed at a position of a back focal point of the biconvex lens 11a, and the objective optical system 11 is laid out in a front telecentric optical arrangement in order to capture a component within a half angle of a, e.g. ±2.5 degrees, with respect to a normal line of the display screen 3, as mentioned above. An incident end (Fi1 to Fin) of the bundle fiber 12a faces to a plane of the aperture stop.

In the measuring probe 40 in this embodiment, the colorimetric optical system 13 (14, 15) comprises: a collecting lens group 13C (14C, 15C) adapted to undergo incidence of light output from the splitting optical system 12 (in this embodiment, from the other end of the bundle fiber 12a); an interference filter 13A (14A, 15A) adapted to undergo incidence of light output from the collecting lens group 13C (14C, 15C) and transmit the output light with a predetermined transmittance characteristic so as to serve as a color filter; and a light-receiving sensor 13B (14B, 15B) adapted to undergo incidence of light output from the interference filter 13A (14A, 15A) and detect intensity of the output light. The collecting lens group 13C (14C, 15C) is formed as a substantially bilateral telecentric system, and the transmittance characteristic of the interference filter 13A (14A, 15A) is adjusted to a predetermined characteristic. Specifically, in order to employ an interference filter as the color filter 13A (14A, 15A), the collecting lens group 13C (14C, 15C) formed as a substantially bilateral telecentric system is interposed between the bundle fiber 12a and the interference filter, and the transmittance characteristic of the interference filter 13A (14A, 15A) is adjusted.

Figure 2:
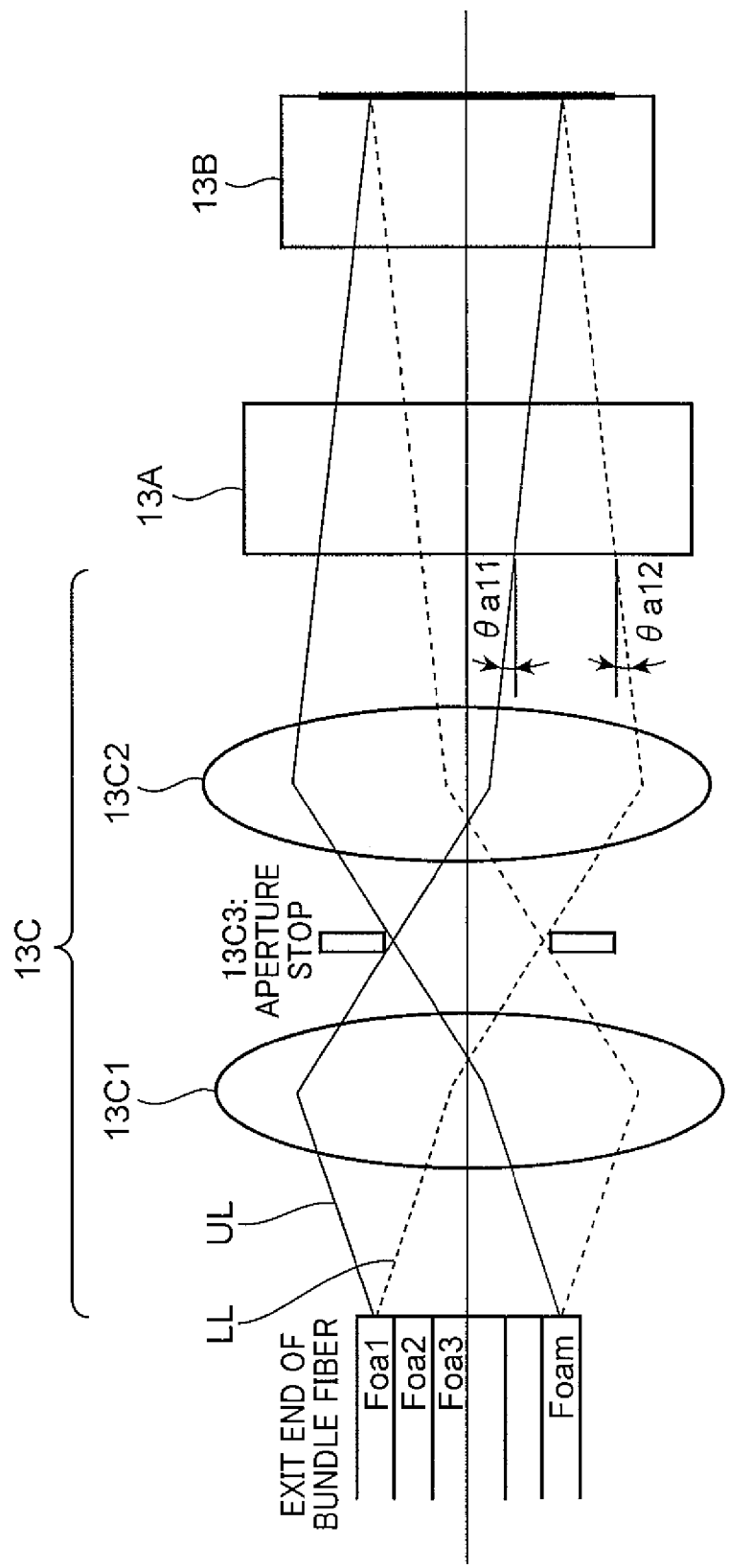
FIG. 2 is a diagram illustrating a specific configuration of a colorimetric optical system of the measuring probe illustrated in FIG. 1.
Figure 3:
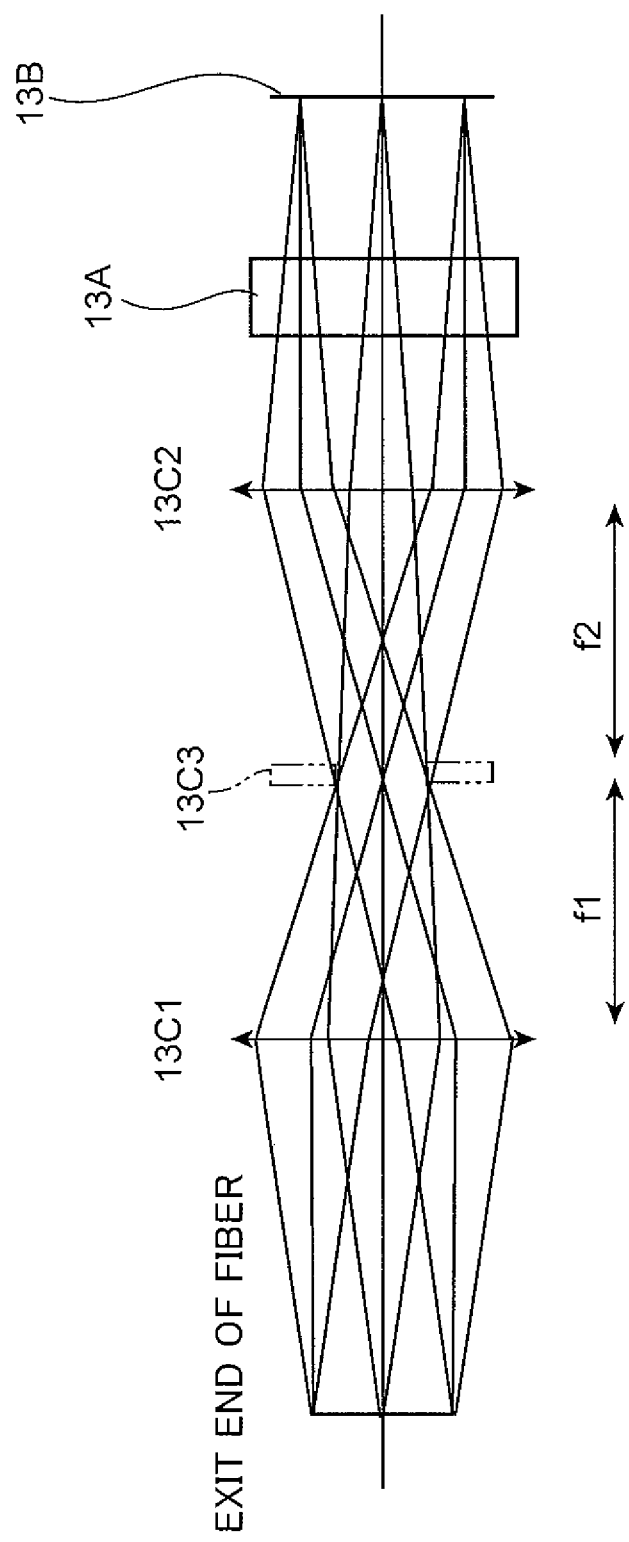
FIG. 3 is a ray diagram corresponding to FIG. 2.

Firstly, with reference to FIG. 2, among the collecting lens groups 13C, 14C, 15C, the collecting lens group 13C will be described as a representative example. Each of the collecting lens groups 14C, 15C is formed in the same manner as that in the collecting lens group 13C. The collecting lens group 13C is configured by equipping it, for example, with two groups of collecting lenses 13C1, 13C2 each having a positive power, and an aperture stop 13C3 interposed therebetween so as to form a bilateral telecentric system. As illustrated in FIG. 3, the aperture stop 13C3 is disposed at a position of an image-side focal length f1 of the collecting lens 13C1 disposed on a measurement plane side of the collecting lens group 13C and at a position of a measurement plane-side focal length f2 of the collecting lens 13C2 disposed on an image side of the collecting lens group 13C. However, assume that the bundle fiber 12a has a length equal to or greater than a predetermined value, and an output angle preliminarily determined by an aperture ratio (NA) of the fiber. In this case, when the two groups of collecting lenses 13C1, 13C2 are arranged with a distance f1+f2 between principal points thereof, the aperture stop 13C may not be particularly provided.

Returning to FIG. 2, the bundle fiber 12a having a length equal to or greater than a predetermined value is combined with the bilaterally telecentric optical system, in the above manner, so that all light beams output from the exit ends Foa1 to Foam of the fiber strands of the bundle fiber 12a become incident on the color filter 13A at identical divergent angles. Thus, even if each of the fiber strands has different information, respective transmittance characteristics in the interference filters become identical, so that light data received by the light-receiving sensor 13B is not influenced by characteristics of the measuring object. In other words, an error induced by rotation of a measuring instrument never occurs. More specifically, in FIG. 2, a light ray UL (solid line) output upwardly from the exit end Foa1 and a light ray LL (broken line) output downwardly from the exit end Foa1 become incident on the color filter 13A at identical divergent angles $\theta a1a$, $\theta a12$, respectively. In this way, the information associated with each of the fiber strands of the bundle fiber 12a can be uniformized.

On the other hand, in the case of the fiber has a short length, the information associated with incident angles is output while keeping it as-is. Thus, light beams output from the fiber strands at respective angles become incident on the color filter 13A at different angles, so that each of the incident light beams has different information, and thereby light-receiving sensitivities to the incident light beams in the light-receiving sensor 13B become different from each other. That is, as mentioned above in connection with FIG. 17, an incident angle onto the color filter 13A varies between a light ray indicated by the solid line and a light ray indicated by the broken line each output from the fiber strand. Therefore, the length of the fiber is sufficiently increased, so that light rays having different incident angles are randomly mixed during passing through the fiber so as thereby to convert the information associated with the light rays, into uniformized information having a divergence defined by the aperture ratio (NA). A length sufficiently enough to cancel out the information associated with incident angles onto each of the fiber strands is equal to or greater than 30 times as large as a core diameter.

Further, in order to achieve a front telecentric optical arrangement, for example, as illustrated in FIG. 4(*a*), assuming that a measurement range is set to a circle of φ27 mm, the objective lens 11*a* is configured such that a light-receiving aperture angle α is set to ±2.3 degrees in design, considering that it is within ±2.3 degrees in an industrial standard for measuring a liquid crystal monitor, while taking into account lens performance (aberration, etc.), and a distance from the display screen 3 to the objective lens 11*a*, an inlet diameter φ of the bundle fiber 12*a* and an image-side focal length f0 of the objective lens 11*a* are set, respectively, to 30 mm, 4.0 mm and 50 mm, an incident angle α1 (NA) of the bundle fiber 12*a* is about 15 degrees in a half-angle, as described later. In this case, an area of each exit end of (three branched sub-bundles) of the bundle fiber 12*a* is $2.0^2 \times \pi/3 = 4.18$ mm$^2$, and a diameter of the exit end is $2 \times \sqrt{(4.18/\pi)} = 2.3$ mm.

As illustrated in FIG. 4(*b*), the objective lens 11*a* may be in an optical arrangement in which the measurement plane and the incident end (Fi1 to Fin) of the bundle fiber 12*a* are in image forming relation. In this case, positions on the measurement plane are correlated with respective ones of the fiber strands, for example, in such a manner that light emitted from one edge S1 of the measurement plane continually becomes incident on an inlet end Fin at one edge, and light emitted from the other edge S3 of the measurement plane continually becomes incident on an inlet end Fi1 at the other edge.

Figure 5:
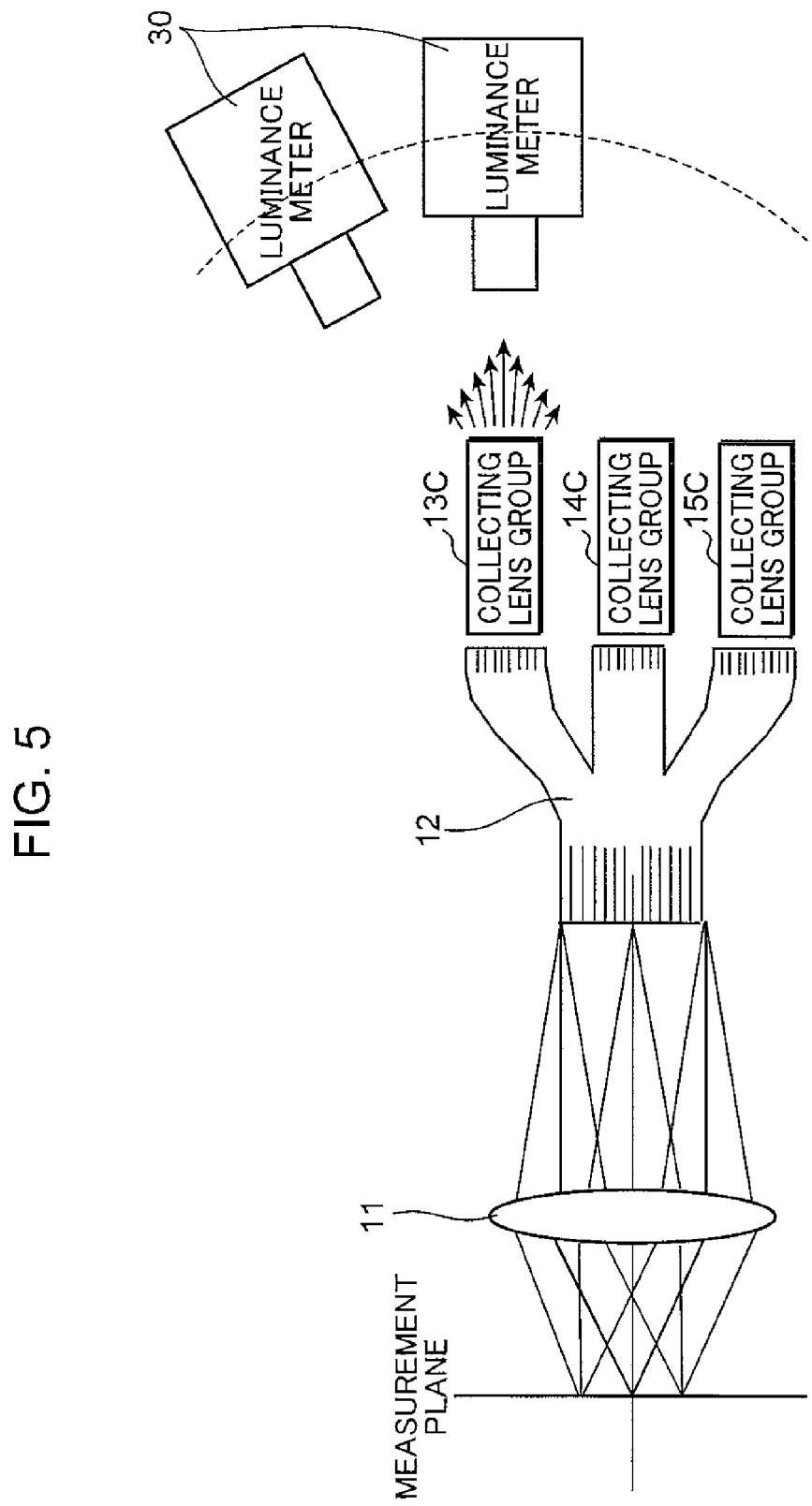
FIG. 5 is a diagram for explaining a method of measuring an intensity distribution of a light beam incident on an interference filter.

In the measuring optical system configured as above, a relationship between an incident angle and a transmittance of the interference filter is as mentioned above in connection with FIG. 22 (example of a Y filter). Correspondingly, in this embodiment, an actual intensity distribution of an incident light beam on the interference filter, which varies based on an aperture ratio (NA) of the bundle fiber 12*a* and characteristics of the collecting lens group 13C (14C, 15C), is obtained, for example, by a measurement illustrated in FIG. 5, or a simulation. In FIG. 5, an intensity of a light beam emitted from the rear collecting lens 13C2 is measured at all solid angles (corn angles) by moving a luminance meter 30 along the same radius from a center of the collecting lens 13C2.

On the other hand, in a simulation, an incident angle onto the interference filter is determined by an exit area and an output angle of the fiber, and a focal length and an lens arrangement of the collecting lens group 13C (14C, 15C). Then, an intensity distribution of a light beam incident on a filter face is calculated from respective conditions and characteristics of various optical components by using lens simulation software or the like. For example, a ray-tracing simulation may be performed based on construction data of the collecting lens group 13C (14C, 15C), provided that light is output from the fiber under a fiber-specific NA.

Figure 6:
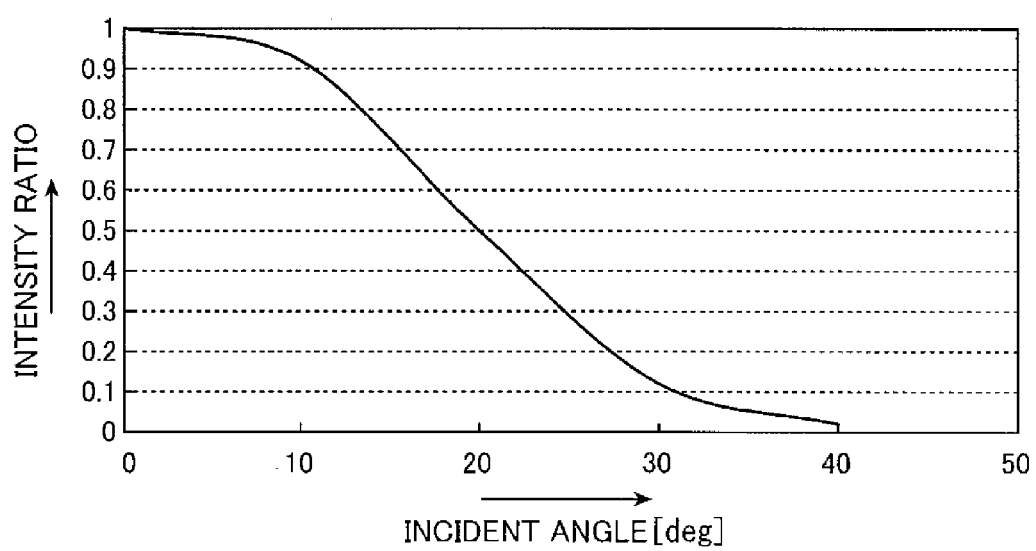
FIG. 6 is a graph illustrating one example of an intensity distribution of a light beam incident on the interference filter.
Figure 7:
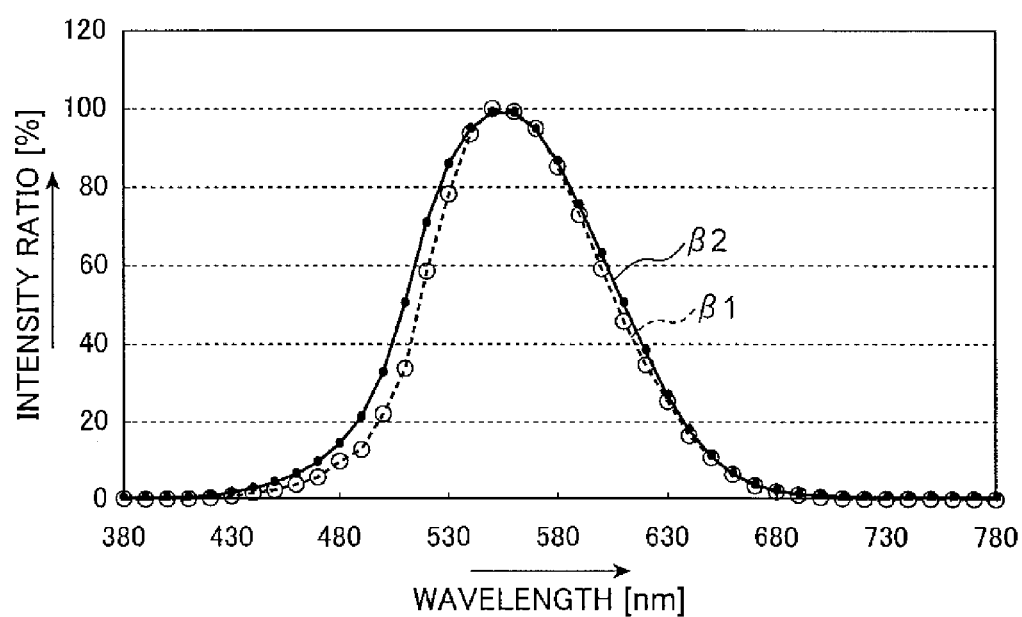
FIG. 7 is a graph illustrating a spectral intensity distribution of the interference filter.

FIG. 6 illustrates an example of the intensity distribution of the light beam incident on the interference filter, obtained in the above manner. The example illustrated in FIG. 6 demonstrates a change in intensity occurring when the luminance meter 30 is moved along a predetermined range of a circular arc (one plane). A filter transmittance set while taking into account an intensity distribution with respect to incident angles can be calculated by multiplying a relative intensity (relative intensity derived based on solid angles: so-called "transmittance in cone angles"), as illustrated in FIG. 6, by a transmittance of the interference filter for each incident angle, as illustrated in FIG. 22. A result of the calculation is obtained as a curved line indicated, for example, by a reference code β1 (broken line) in FIG. 7.

A light-receiving sensitivity finally obtained by a measuring instrument is determined by considering characteristics such as a transmittance of the optical system (lenses, optical fibers, etc.), light-receiving sensitivity of the light-receiving sensor, a reflection characteristic of a surface of the light-receiving sensor or the like, as well as the above filter transmittance. This is used as an ultimate light-receiving sensitivity. In this embodiment, the interference filter is adjusted so that the finally obtained light-receiving sensitivity turns out to be approximated to a desired color-matching function (defined by CIE) such as indicated by a reference sign 132 (solid line) in FIG. 7.

A condition for divergence of an incident angle onto the interference filter will be described below. If the interference filter is installed in an inclined posture due to component error, an intensity distribution with respect to incident angles onto the interference filter is deviated from a design value. Along with the deviation, obtained filter transmittance becomes different, and therefore a light-receiving sensitivity distribution of the sensor becomes different. The influence of change in transmittance occurring when the filter is installed in an inclined posture becomes more significant as the intensity distribution becomes narrower. Thus, it is desirable that the intensity distribution with respect to incident angles onto the filter has a certain level or more of range.

Figure 8A:
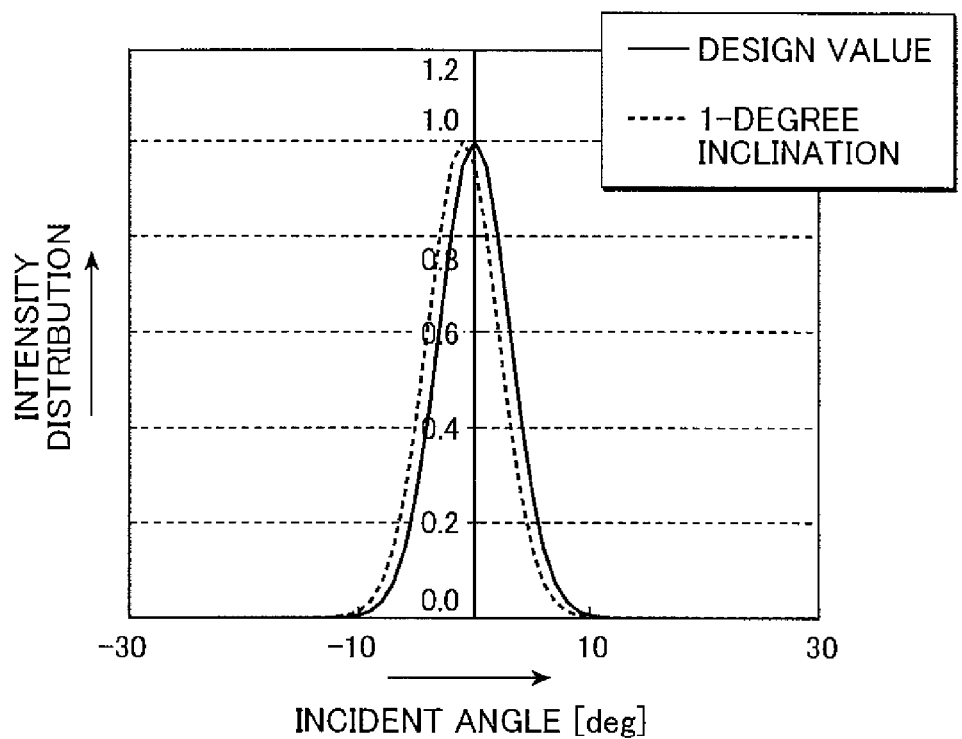
FIG. 8 is a graph illustrating an intensity distribution depending on an incident angle onto the interference filter, and an influence of tilt of the filter.
Figure 8B:
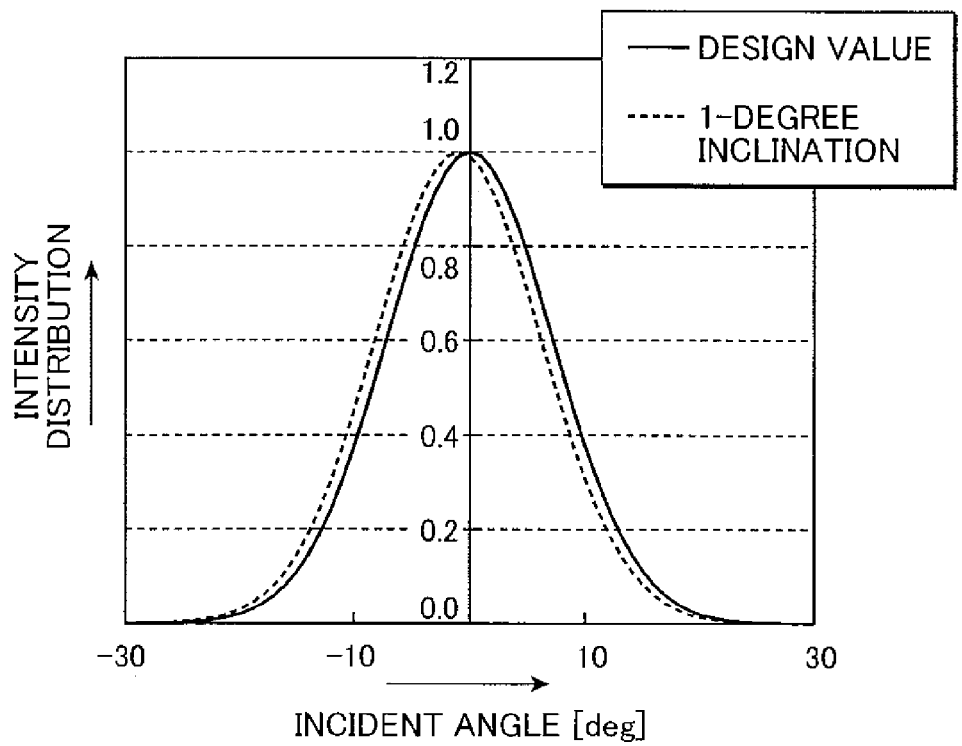

In this regard, FIG. 8 illustrates a distribution of incident angles and an influence of inclination of the filter. FIG. 8(*a*) is a graph illustrating an intensity distribution in design values, obtained when the incident angle is 7.5 degrees in a half angle (solid line), and an intensity distribution obtained when the filter is inclined by 1 degree (broken line). FIG. 8(*b*) is a graph illustrating an intensity distribution in design values, obtained when the incident angle is 17.5 degrees in a half angle (solid line), and an intensity distribution obtained when the filter is inclined by 1 degree (broken line). In this example, the incident angle of 7.5 degrees (half angle) is equivalent to an angle corresponding to about 5% of a peak value of the intensity distribution with respect to incident angles (in many cases, the peak value appears at 0 degree).

Figure 9A:
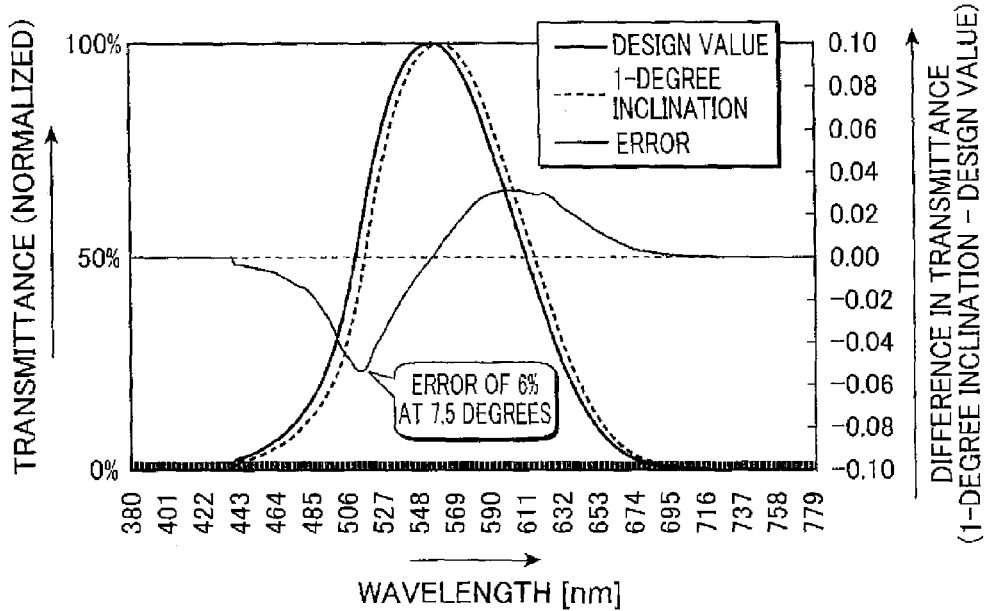
FIG. 9 is a graph illustrating a transmittance distribution in the case where the interference filter is installed in an optical system having the incident angle-dependent intensity distribution illustrated in FIG. 8.
Figure 9B:
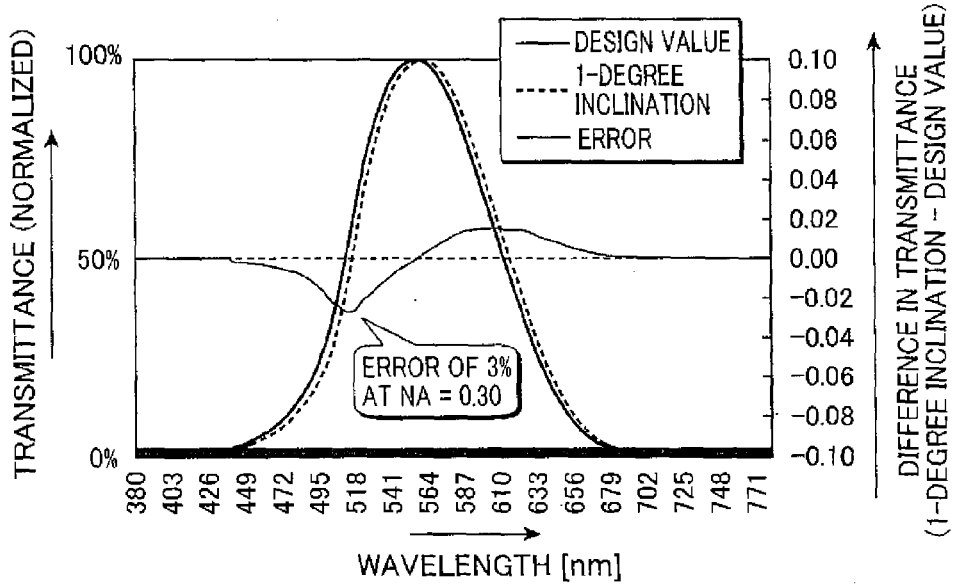
Figure 10:
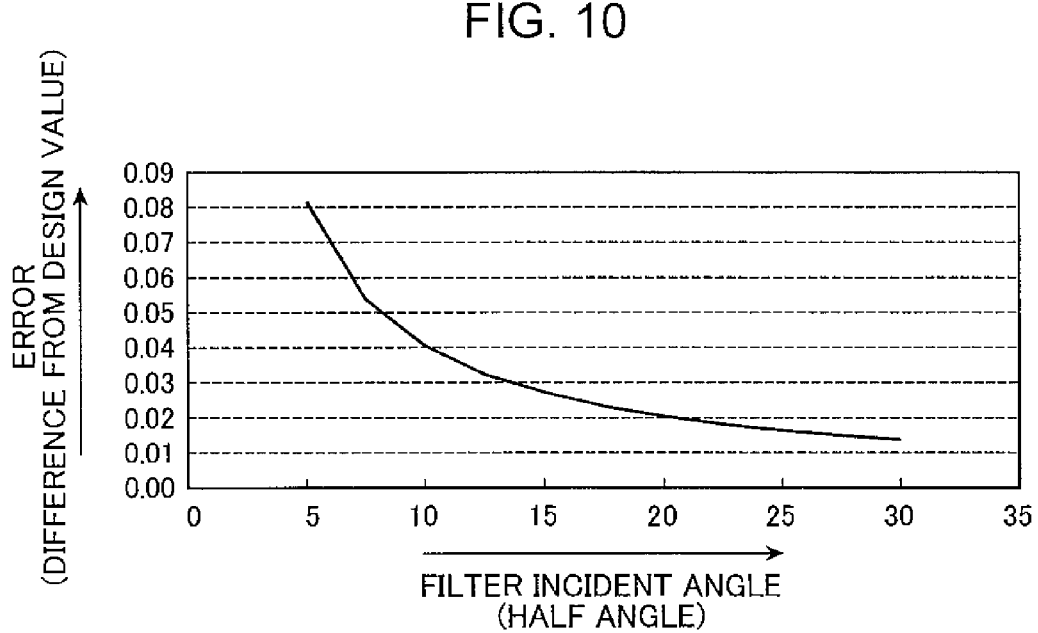
FIG. 10 is a graph illustrating a relationship between an incident angle onto the interference filter, and an error.

FIGS. 9(*a*) and 9(*b*) illustrate transmittance distributions obtained when the interference filter illustrated in FIG. 22 is installed in the optical systems each having a respective one of the incident angle distributions illustrated in FIGS. 8(*a*) and 8(*b*). In FIGS. 9(*a*) and 9(*b*), a deviation in an inclination value with respect to the design value is indicated with emphasis. As is clear from comparison between FIGS. 9(*a*) and 9(*b*), an error due to inclination of the filter becomes smaller as the intensity distribution with respect to incident angles becomes wider. The relationship between a level of incident angle onto the filter (filter incident angle) and an error (a difference from the design value) is graphically represented as a curve illustrated in FIG. 10. FIG. 10 shows that, in a situation where the filter is inclined by 1 degree, the error can be suppressed to 2.5% or less by setting the divergence of the incident angle to above 15 degrees (half angle). Thus, in view of error sensitivity with respect to inclination of the fiber during actual use, it is desirable that the divergence of the incident angle onto the interference filter is set to 15 degrees or more (half angle).

Figure 11:
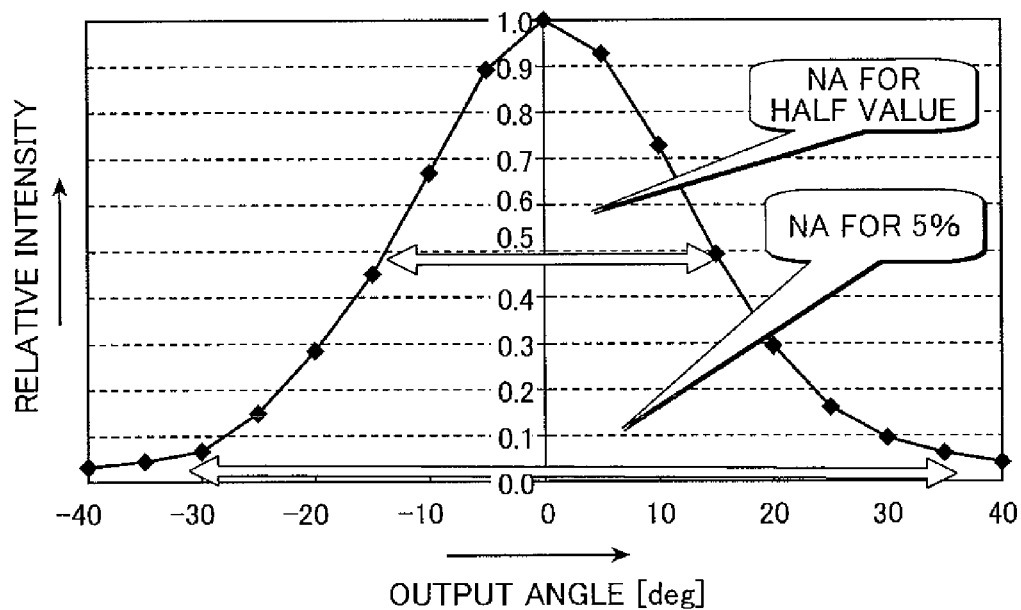
FIG. 11 is a graph illustrating an example of an intensity distribution depending on an output angle from a bundle fiber.

Therefore, in order to allow the incident angle α1 onto the bundle fiber 12*a* to become 15 degrees or more in a half angle, the aperture ratio NA of the bundle fiber 12*a* is set to 0.26 (15 degrees) or more. The term "NA of the fiber" here means both an NA in design and an actual (effective) NA. The NA in design is a value generally calculated from a refractive index of a core of the fiber and a refractive index of a clad of the fiber, and the actual (effective) NA is an actually measured value of output angle from the fiber (fiber output angle). As illustrated in FIG. 11, the actual fiber output angle is similar to a Gaussian shape, and includes an NA (50%) for use in indicating a width corresponding to a half of a peak value, and an NA (5%) for use in indicating a width corresponding to 5% of the peak value. In the case where the incident angle α1 on the fiber is set to 15 degrees as mentioned above, light can be guided only if the effective NA (5%) is 15 degrees or more. Thus, the NA is set to satisfy the following relation: NA (5%)>NA 0.26 (15 degrees).

Figure 12:
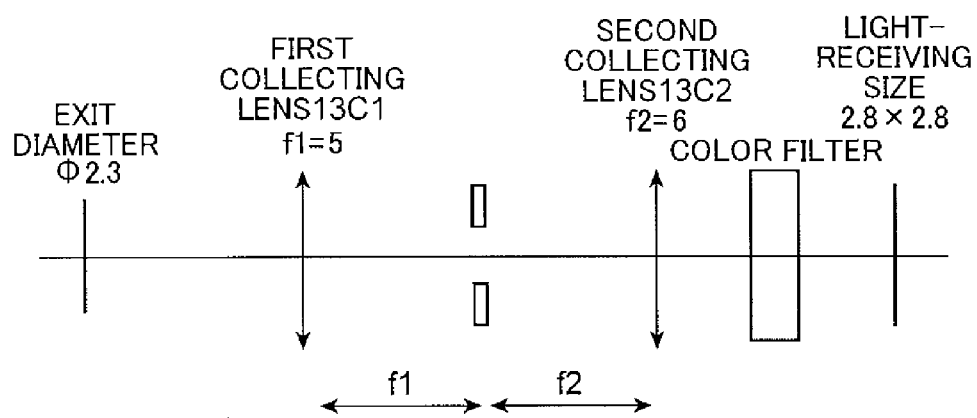
FIG. 12 is a diagram schematically illustrating a specific example of a layout of a collecting lens group.

As illustrated in FIG. 12, as a specific design of the collecting lens group 13C (14C, 15C), assuming that the exit diameter φ of the bundle fiber 12a is 2.3 mm as mentioned above, and a size of a light-receiving face of the light-receiving sensor 13B (14B, 15B) is 2.8×2.8 mm, a magnification of the collecting lens group 13C (14C, 15C) may be less than 2.8/2.3=1.22, for example, 1.2, in order to receive all light beams output from the bundle fiber 12a by the light-receiving sensors 13B, 14B, 15B. Thus, a ratio f2/f1 between an image-side focal length f1 of the first collecting lens 13C1 and a measurement plane-side focal length f2 of the second collecting lens 13C2 is also set to 1.2, wherein f1=5 mm, and f2 is 6 mm.

Figure 13:
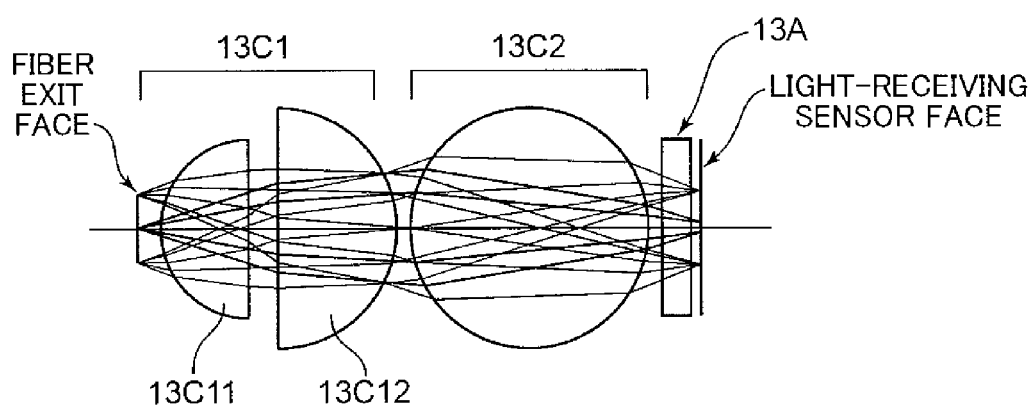
FIG. 13 is a diagram illustrating a specific example of a configuration of the collecting lens group.

In this case, the first collecting lens 13C1 can be configured compactly as it comes closer to the exit face of the bundle fiber 12a. Further, the fiber output angle is wide as mentioned above (Fno (F number) for the lens is bright). Thus, if the collecting lens 1 is composed of a single lens, deterioration in performance becomes significant. Therefore, as illustrated in FIG. 13, the first collecting lens 13C1 is composed of two lenses 13C11, 13C12. Further, a hemispherical lens, a ball lens or a plano-convex lens may be used to simplify the lens as much as possible.

In FIG. 13, the lens 13C11 disposed relatively close to the measuring object side consists of a first hemispherical lens convex toward the measuring object side, and the lens 13C12 disposed relatively close to the image side consists of a second hemispherical lens convex toward the image side. The second collecting lens 13C2 consists of a ball lens. Then, assuming that a focal length of the first collecting lens 13C1 (combined focal length of the first and second hemispherical lenses 12C11 and 12C12) is set to the f1, and a focal length of the second collecting lens 13C2 is set to the f2, a distance between principal points of the first and second collecting lenses 13C1, 13C2 may be set to f1+f2. In this case, an aperture stop between the first and second collecting lenses 13C1, 13C2 becomes unnecessary, and the substantially bilateral telecentric system is formed. Each of the lenses 13C11, 13C12, 13C2 is a glass lens made of BK 7, and they consist of a hemispherical lens with R=3 mm, a hemispherical lens with R=4 mm, and a ball lens with φ=8 mm, respectively.

As above, the measuring probe 40 in this embodiment is employed in a color luminance meter, a colorimeter and others, and configured such that the objective optical system 11 receives light beams emitted from a light source or light beams reflected by a measuring object, and allow the light beams to become incident on the bundle fiber 12a comprised of a large number of fiber strands bundled together, wherein the light beams are split and output from two or more exit faces of the bundle fiber 12a, whereafter the light beams are transmitted through the color filters 13A, 14A, 15A each consisting of an interference filter, and introduced into the light-receiving sensors 13B, 14B, 15B for obtaining intensity of the light beams (luminance or illuminance value). In order to solve the aforementioned problem with absorption color filters, the collecting lens group 13C (14C, 15C) formed as a substantially bilateral telecentric system is interposed between the bundle fiber 12a and the color filter 13A (14A and 15A), and a transmittance characteristic of each of the interference filters is adjusted.

Thus, irrespective of a position of the bundle fiber 12a from which a light beam becomes incident on the collecting lens group 13C (14C, 15C), a light beam is output from an exit face of the collecting lens group 13C (14C, 15C) with a predetermined luminous intensity distribution and in a uniformized state, and thereby the transmittance characteristic of each of the interference filters is set such that, when a light beam output from the exit face of the collecting lens group 13C (14C, 15C) with the predetermined luminous intensity distribution becomes incident on the interference filter, a resulting transmitted light beam has a transmittance characteristic corresponding to a measurement parameter of the light-receiving sensor 13B (14B, 15B). As a result, the luminous intensity distribution is widened but uniformized (normalized), and the transmittance characteristic of the interference filter is coordinated with the luminous intensity distribution, instead.

Therefore, the measuring prove 40 in this embodiment can utilize advantages of an interference filter, such as a capability to set any transmittance characteristic, low light intensity loss and high stability, while making up for an disadvantage of the interference filter, i.e., a large deviation in the transmittance characteristic due to incident angles.

It is desirable that the collecting lens group 13C (14C, 15C) is formed as a perfectly telecentric system. However, in connection with lens performances (aberrations, etc.), it is difficult to form a perfectly telecentric system. Considering "an angle of a principal ray" as an index expressing a level of telecentricity, it has been ascertained by experimental tests of the inventor of the present invention that even if an angle of a principal ray of a peripheral light beam is inclined by 15 degrees, no problem occurs in actual use, and it is only necessary to achieve substantial telecentricity. Thus, the telecentric system of the present invention includes such substantial telecentricity. Further, as for randomness of the fiber strands of the bundle fiber 12a, it is difficult to arrange them in a perfectly randomly manner. The technique of the Patent Document 1 may be employed in the present invention.

The specification discloses the aforementioned arrangements. The following is a summary of the primary arrangements of the embodiments.

According to one aspect, there is provided a measuring optical system which comprises: an objective optical system for receiving light beams from a measuring object; a bundle fiber comprised of a large number of fiber strands bundled together, and formed such that light emitted from the objective optical system becomes incident on one, first, end thereof, and the fiber strands are divided into two or more sub-bundles on the other, second, end; and an interference filter adapted to undergo incidence of light output from the second end of each of the divided sub-bundles, and allow the incident light to be transmitted therethrough with a predetermined transmittance characteristic and introduced into a sensor for obtaining intensity of the light beams, wherein the measuring optical system further comprises a collecting lens group interposed between the bundle fiber and the interference filter, and formed as a substantially bilateral telecentric system, and wherein the interference filter is formed to obtain a transmittance characteristic corresponding to a measurement parameter, according to a condition of an intensity distribution with respect to incident angles of light incident on the interference filter.

The measuring optical system having the above feature is employed, for example, in a color luminance meter and a colorimeter. The objective optical system is operable, when the measuring optical system is employed in the color luminance meter, to receive light beams emitted from a light source, such as a liquid crystal monitor or a lamp, or, when the measuring optical system is employed in the colorimeter, to receive light beams of illumination light emitted from a predetermined illumination light source and then reflected by a measuring object, and allow the light beams to become incident on the bundle fiber comprised of a large number of fiber strands bundled together. The light beams are split and output from two or more exit faces of the bundle fiber. Then, the light beam is introduced into the light-receiving sensor for obtaining intensity of the light beam (luminance or illuminance value), through the interference filter. In this manner, the measuring optical system intends to solve the problem with absorption color filters. Further, in the measuring optical system, the collecting lens group is interposed between the bundle fiber and the interference filter, and a transmittance characteristic of the interference filter is adjusted.

More specifically, firstly, the collecting lens group is configured to form a substantially bilateral telecentric system, so that the light beam is output from an exit face of the collecting lens group with a predetermined luminous intensity distribution and in a uniformized state, irrespective of a position of the bundle fiber from which the light beam becomes incident on the collecting lens group. Secondly, a transmittance characteristic of the interference filter is set such that, when a light beam output from the exit face of the collecting lens group with a predetermined luminous intensity distribution becomes incident on the interference filter, a resulting transmitted light beam has a transmittance characteristic corresponding to a measurement parameter of the sensor. Specifically, conventionally, in order to suppress a deviation in the transmittance characteristic due to incident angles onto an interference filter, it has bee tried to allow a light beam incident on the interference filter to become close to parallel rays (allow the luminous intensity distribution to become narrow). Differently, in this aspect, although the luminous intensity distribution is widened, uniformity is given to the luminous intensity distribution, and the transmittance characteristic of the interference filter is coordinated with the luminous intensity distribution, instead.

Therefore, the measuring optical system having the above feature can utilize advantages of an interference filter, such as a capability to set any transmittance characteristic, low light intensity loss and high stability, while making up for an disadvantage of the interference filter, i.e., a large deviation in the transmittance characteristic due to incident angles.

According to another aspect, in the above mentioned measuring optical system, a divergence of the incident angle onto the interference filter is 15 degrees or more with respect to a normal line of the interference filter.

In the measuring optical system having the above feature, the predetermined the luminous intensity distribution, i.e., the solid angle (cone angle), may be widened to 15 degrees or more, as mentioned above, which makes it possible to reduce an error due to inclination of the interference filter.

According to another aspect, in the above mentioned measuring optical system, the collecting lens group comprises: a first lens group including a first hemispherical lens convex toward a measuring object side and a second hemispherical lens convex toward an image side; and a second lens group including a ball lens, wherein a distance between principal points of the first and second lens groups is set to f1+f2, where f1 is a focal length of the first lens group, and f2 is a focal length of the second lens group.

The measuring optical system having the above feature can form the substantially bilateral telecentric system while eliminating a need for an aperture stop between the second hemispherical lens and the ball lens.

According to another aspect, there are provided a color luminance meter and a colorimeter each comprising the above measuring optical system.

Thus, each of the color luminance meter and the colorimeter comprising the measuring optical system can attain a high-accuracy color luminance meter and a high-accuracy colorimeter using an interference filter.

This application is based on Japanese Patent Application Serial No. 2010-83954 filed in Japan Patent Office on Mar. 31, 2010, the contents of which are hereby incorporated by reference.

Although the present invention has been adequately and fully described by way of example with reference to the accompanying drawings, it is to be understood that various changes and/or modifications will be apparent to those skilled in the art. Therefore, unless otherwise such changes or modifications implemented by those skilled in the art depart from the scope of the present invention hereinafter defined, they should be construed as being included therein.

INDUSTRIAL APPLICABILITY

The present invention can provide a measuring optical system, and a color luminance meter and a colorimeter each using the measuring optical system.

What is claimed is:
1. A measuring optical system comprising:
an objective optical system for receiving light from a measuring object;
a bundle fiber comprised of a plurality of fiber strands bundled together, and formed such that light emitted from the objective optical system becomes incident on one, first, end thereof, and the fiber strands are divided into two or more sub-bundles on the other, second, end; and
two or more colorimetric optical systems each provided in corresponding relation to a respective one of the divided second ends of the bundle fiber and adapted to detect light output from the divided second end of the bundle fiber,
each colorimetric optical system including:
a collecting lens group adapted to undergo incidence of light output from the divided second end of the bundle fiber, and formed as a substantially bilateral telecentric system;
an interference filter adapted to undergo incidence of light output from the collecting lens group and transmit the output light with a predetermined transmittance characteristic; and
a light-receiving sensor adapted to undergo incidence of light output from the interference filter and detect intensity of the output light,
wherein the interference filter is formed to obtain a transmittance characteristic corresponding to a measurement parameter, according to a condition of an intensity distribution with respect to incident angles of light incident on the interference filter,
wherein the measurement parameter is a preliminarily measured angle intensity distribution of the light falling on the interference filter after passing through the collecting lens group, and
wherein the transmittance characteristic is calculated by multiplying the angle intensity distribution of the inci- dent light which is the measurement parameter and a transmittance of the interference filter for each incident angle.

2. The measuring optical system according to claim 1, wherein a divergence of the incident angle onto the interference filter is 15 degrees or more with respect to a normal line of the interference filter.

3. The measuring optical system according to claim 1, wherein the collecting lens group comprises:
a first lens group including a first hemispherical lens convex toward a measuring object side and a second hemispherical lens convex toward an image side; and
a second lens group including a ball lens,
and wherein a distance between principal points of the first and second lens groups is set to f1+f2, where f1 is a focal length of the first lens group, and f2 is a focal length of the second lens group.

4. A color luminance meter comprising the colorimetric optical system according to claim 1.

5. A colorimeter comprising the colorimetric optical system according to claim 1.

6. A measuring optical system comprising:
an objective optical system for receiving light from a measuring object;
a bundle fiber comprised of a plurality of fiber strands bundled together, and formed such that light emitted from the objective optical system becomes incident on one, first, end thereof, and the fiber strands are divided into two or more sub-bundles on the other, second, end; and
two or more colorimetric optical systems each provided in corresponding relation to a respective one of the divided second ends of the bundle fiber and adapted to detect light output from the divided second end of the bundle fiber,
each colorimetric optical system including:
a collecting lens group adapted to undergo incidence of light output from the divided second end of the bundle fiber, and formed as a substantially bilateral telecentric system;
an interference filter adapted to undergo incidence of light output from the collecting lens group and transmit the output light with a predetermined transmittance characteristic; and
a light-receiving sensor adapted to undergo incidence of light output from the interference filter and detect intensity of the output light,
wherein the interference filter is formed to obtain a transmittance characteristic corresponding to a measurement parameter, according to a condition of an intensity distribution with respect to incident angles of light incident on the interference filter,
wherein the measurement parameter is a preliminarily measured angle intensity distribution of the light falling on the interference filter after passing through the collecting lens group, and
wherein the transmittance characteristic of the interference filter is adjusted so that a finally obtained light-receiving sensitivity of each colorimetric optical system turns out to be approximated to a desired color-matching function.

7. The measuring optical system according to claim 6, wherein the desired color-matching function is defined by CIE.

8. A measuring optical system comprising:
an objective optical system for receiving light from a measuring object;
a bundle fiber comprised of a plurality of fiber strands bundled together, and formed such that light emitted from the objective optical system becomes incident on one, first, end thereof, and the fiber strands are divided into two or more sub-bundles on the other, second, end; and
two or more colorimetric optical systems each provided in corresponding relation to a respective one of the divided second ends of the bundle fiber and adapted to detect light output from the divided second end of the bundle fiber,
each colorimetric optical system including:
a collecting lens group adapted to undergo incidence of light output from the divided second end of the bundle fiber, and formed as a substantially bilateral telecentric system;
an interference filter adapted to undergo incidence of light output from the collecting lens group and transmit the output light with a predetermined transmittance characteristic; and
a light-receiving sensor adapted to undergo incidence of light output from the interference filter and detect intensity of the output light,
wherein the interference filter is formed to obtain a transmittance characteristic corresponding to a measurement parameter, according to a condition of an intensity distribution with respect to incident angles of light incident on the interference filter,
wherein the measurement parameter is a preliminarily measured angle intensity distribution of the light falling on the interference filter after passing through the collecting lens group, and
wherein the transmittance characteristic is calculated by multiplying the angle intensity distribution of the incident light which is the measurement parameter and a transmittance of the interference filter for each incidence angle; and
wherein the transmittance characteristic of the interference filter is adjusted so that a finally obtained light-receiving sensitivity of each colorimetric optical system turns out to be approximated to a desired color-matching function defined by CIE.

* * * * *